United States Patent [19]

Morita et al.

[11] Patent Number: 5,590,340
[45] Date of Patent: Dec. 31, 1996

[54] APPARATUS AND METHOD FOR SUSPENDING AND RESUMING SOFTWARE APPLICATION ON A COMPUTER

[75] Inventors: Mitsuaki Morita, Hirakata; Masaya Miyazaki, Ikeda; Nobuyuki Enoki, Kadoma; Akira Takuma, Kyoto, all of Japan

[73] Assignee: Matsushita Electric Industrial Co., Ltd., Osaka, Japan

[21] Appl. No.: 221,993

[22] Filed: Apr. 1, 1994

Related U.S. Application Data

[63] Continuation of Ser. No. 895,812, Jun. 9, 1992, abandoned.

[30] Foreign Application Priority Data

Jun. 10, 1991 [JP] Japan ..................... 3-137484

[51] Int. Cl.⁶ .................................................. G06F 1/32
[52] U.S. Cl. ................................................... 395/750
[58] Field of Search ........................... 395/750, 575; 380/25

[56] References Cited

U.S. PATENT DOCUMENTS

| | | | |
|---|---|---|---|
| 3,959,778 | 5/1976 | Brette ...................... | 395/575 |
| 4,096,560 | 6/1978 | Footh ...................... | 395/575 |
| 4,218,764 | 8/1980 | Furuta et al. ............. | 365/222 |
| 4,307,455 | 12/1981 | Juhasz et al. ............ | 395/575 |
| 4,327,410 | 4/1982 | Patel et al. .............. | 395/575 |
| 4,458,307 | 7/1984 | McAnlis et al. .......... | 395/575 |
| 4,611,289 | 9/1986 | Coppola ................... | 395/750 |
| 4,651,307 | 3/1987 | Toumayan et al. ........ | 395/575 |
| 4,763,333 | 8/1988 | Byrd ........................ | 371/66 |
| 4,907,150 | 3/1990 | Arroyo et al. ............ | 395/575 |
| 4,930,101 | 5/1990 | Wong et al. .............. | 395/750 |
| 4,979,143 | 12/1990 | Takano et al. ............ | 395/575 |
| 5,073,933 | 12/1991 | Rosenthal ................. | 380/25 |
| 5,109,505 | 4/1992 | Kihara ..................... | 395/575 |
| 5,129,091 | 7/1992 | Yorimoto et al. ......... | 395/750 |
| 5,148,546 | 9/1992 | Blodgett ................... | 395/750 |
| 5,218,607 | 6/1993 | Saito et al. ............... | 395/575 |
| 5,241,508 | 8/1993 | Bevengnel et al. ....... | 365/229 |
| 5,276,890 | 1/1994 | Arai ......................... | 395/750 |
| 5,333,309 | 7/1994 | Hibi ......................... | 395/575 |
| 5,392,438 | 2/1995 | Gunji ....................... | 395/750 |
| 5,404,546 | 4/1995 | Stewart .................... | 395/750 |

FOREIGN PATENT DOCUMENTS

| | | |
|---|---|---|
| 0230351 | 1/1987 | European Pat. Off. . |
| 0365128 | 9/1989 | European Pat. Off. . |
| 0462565 | 6/1991 | European Pat. Off. . |
| 0481508 | 10/1991 | European Pat. Off. . |
| 60-254316 | 12/1985 | Japan . |

OTHER PUBLICATIONS

Book Computer J–3100SS002 DynaBook/DynaBook Guide, Jun. 22, 1990.

*Primary Examiner*—Ayaz R. Sheikh
*Attorney, Agent, or Firm*—Price, Gess & Ubell

[57] ABSTRACT

The control unit of a computer system comprises a first storing device for holding written data while the power is on, a second storing device for holding the written data, even when the power is off and a power-off preserving device for terminating power to the system after transferring the data held in the first storing device to the second storing device. The control system can be utilized to only store the effective contents of the operating data to thereby enable data reconstruction upon resumption of power. The control device can interface with a window system processing device which can enable the refreshing of graphic display information upon resumption of power. The second storing device may have limited memory capacity and the operator can be informed of its capacity prior to a final shut-off of power. The control unit can further identify those programs that are not capable of being restored to their original condition and accordingly canceling any program execution when such a condition is judged.

10 Claims, 25 Drawing Sheets

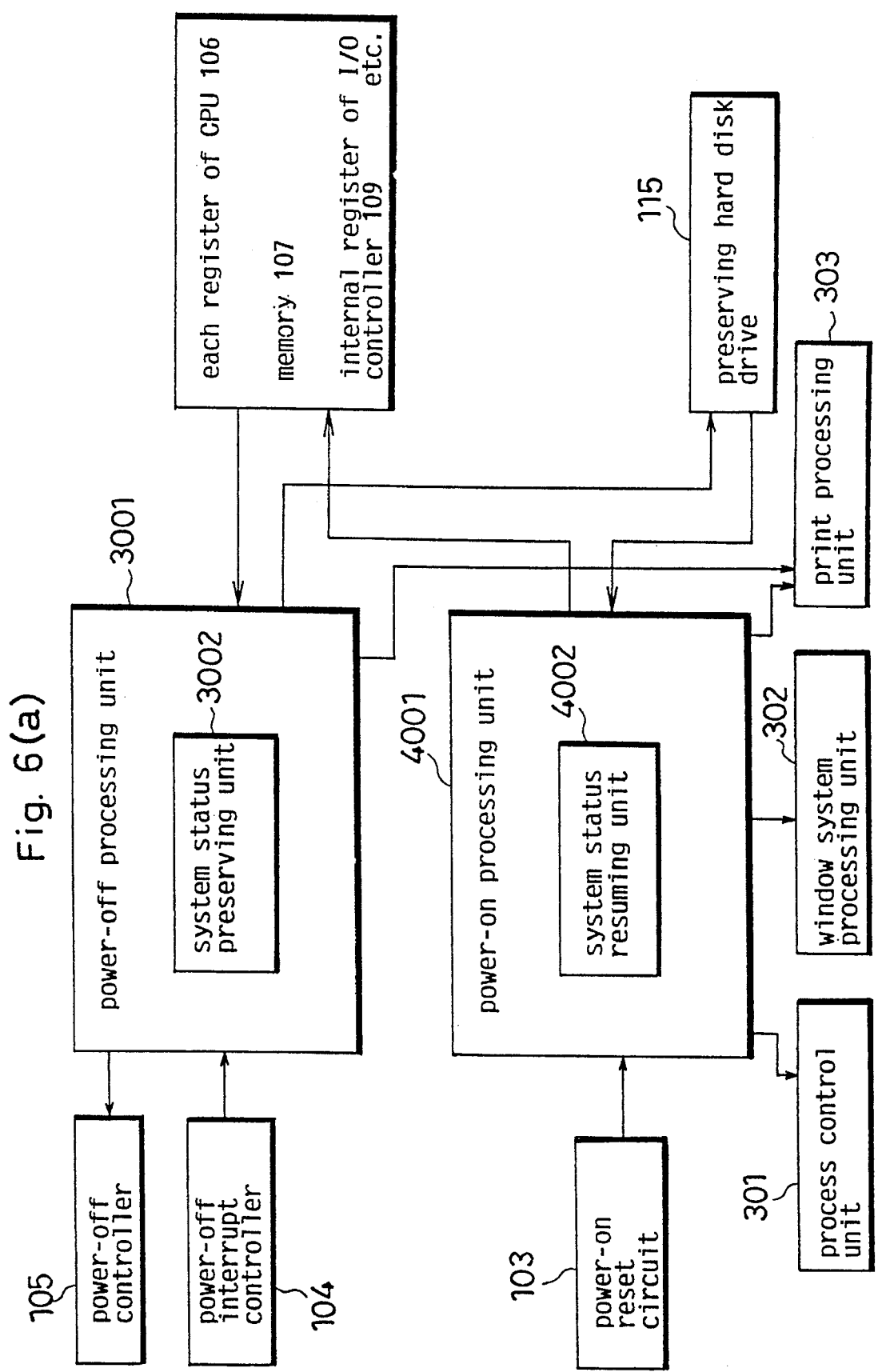

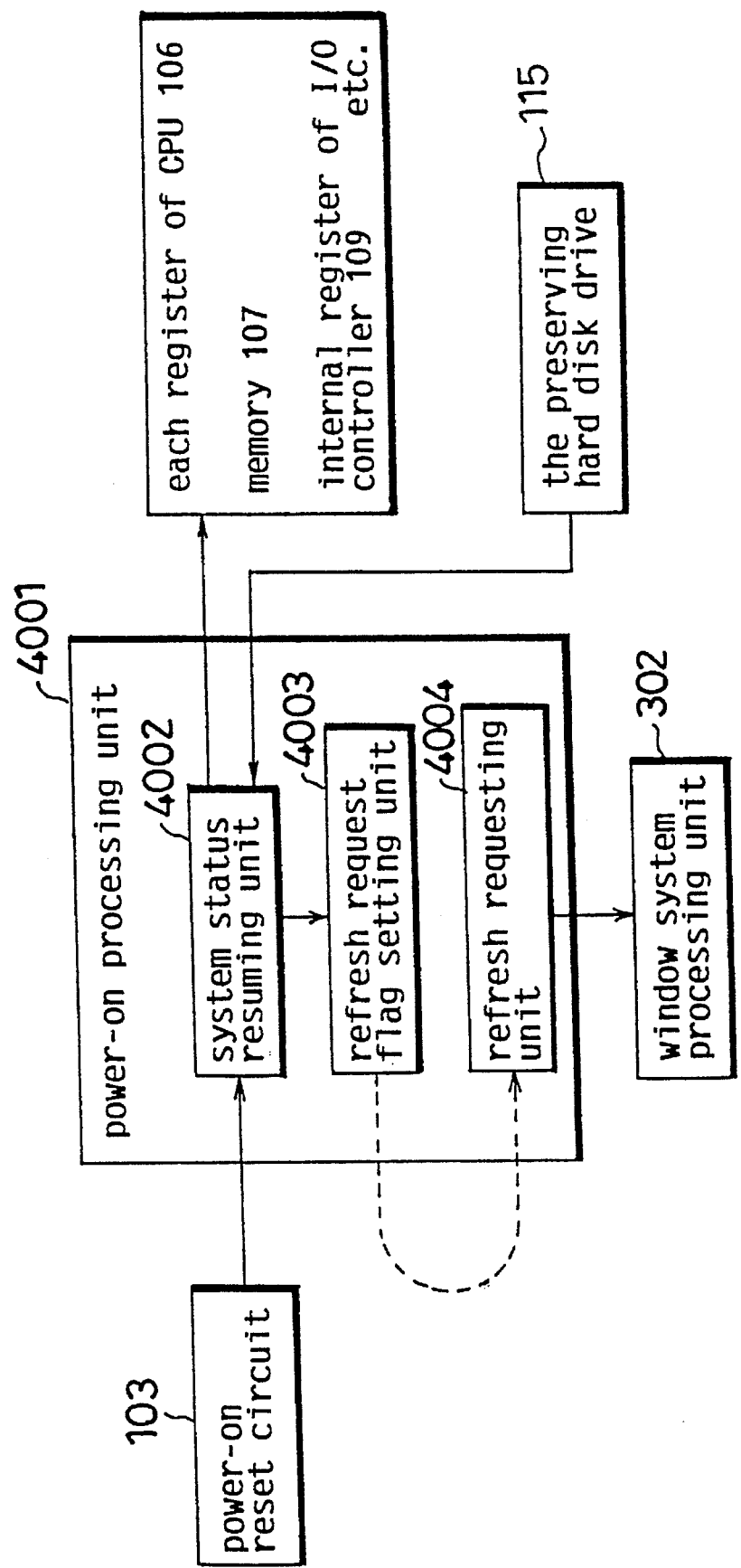

Fig. 8

```
local-WS% cat userfile
/home/machine/usr_name patent1    patent2    pa
patent4    patent4-1  pa
patent5    patent6 local-WS% date
Tue May 29 16:35:52 JST local-WS%
```

| user1 | ttyp0 | May 29 09:50 |
| user2 | ttyp1 | May 29 09:10 |
| user2 | ttyp2 | May 29 09:11 |
| user2 | ttyp3 | May 29 09:11 |

Fig. 15

| Window system | identify condition |
|---|---|
| X-window Window system | XOpenDisplay("NULL") ≠ NULL |
| Sunview Window system | We_getparentwindow(parent) = 0 |

Fig. 18

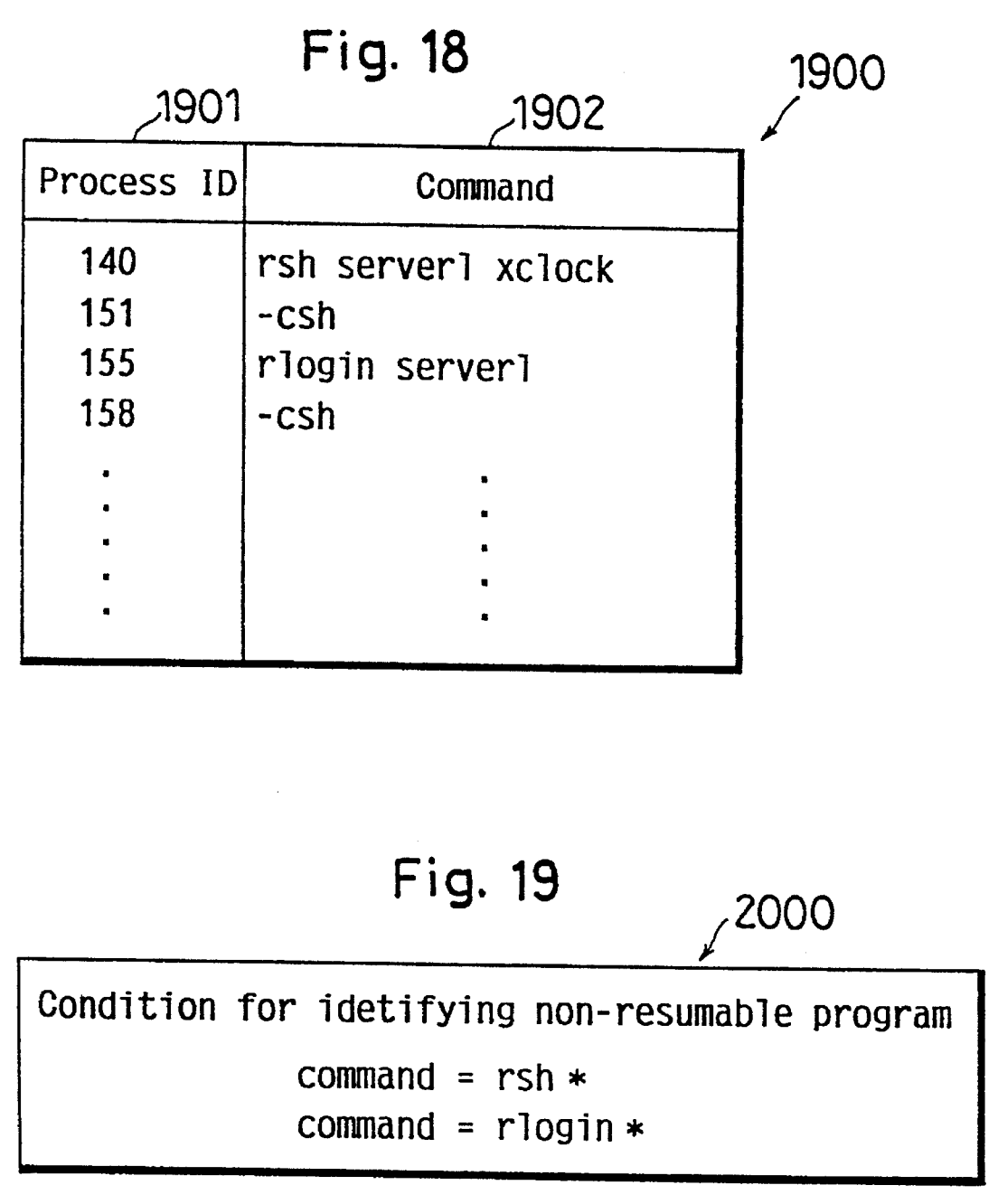

| Process ID | Command |
|---|---|
| 140 | rsh server1 xclock |
| 151 | -csh |
| 155 | rlogin server1 |
| 158 | -csh |
| ⋮ | ⋮ |

Fig. 19

Condition for idetifying non-resumable program command = rsh *
command = rlogin *

APPARATUS AND METHOD FOR SUSPENDING AND RESUMING SOFTWARE APPLICATION ON A COMPUTER

This is a continuation of application Ser. No. 07/895,812 filed Jun. 9, 1992, abandoned.

BACKGROUND OF THE INVENTION

(1) Field of the Invention

This invention relates to a method and apparatus for suspending and resuming the execution of an application program during a power off/on cycle, which are applied to computer systems such as personal computers and workstations.

(2) Description of the Related Art

In former computer systems, storing device such as memory or registers provided to the systems could not hold data once the systems were powered off so that the previous status could not be resumed even when the systems were powered back on, if the power was turned off during the execution of a program.

Therefore, the user, when desired to power off during the operation and to restart it at a later time, needed the operations as shown in FIG. 1(a) and in the following, before powering off and after powering back on.

(Before powering off)
  (1) Store the document being processed into a floppy disk
  (2) Terminate the execution of the word processing program (After powering back on)
  (3) Set the floppy disk and start the operating system from the beginning (for example, MICRO SOFT MS-DOS)
  (4) Start the word processing program
  (5) Retrieve the stored document to process Some of the recently developed portable personal computers named book type or notebook type have the function called resume function. This enables the user to restart his operation at the exact execution point at which it is suspended during a power off operation, thereby bypassing the above procedure. All the user has to do is to power off/on at any desired point as shown in FIG. 1(b).

Toshiba "DynaBook guide" states such a function is implemented by employing a battery built in the personal computer.

Such a personal computer seems to have a construction shown in FIG. 2 where a power unit 5006 having a battery 5008 is connected with an external power unit 5007 and a power switch 5112, and supplies power to a control board 5001, a display device 5105, an input device 5106, and an external storage unit 5005. The control board 5001 mounts a Central Processing Unit (CPU) 5101, a memory 5102, a display control unit 5002, an external storage controller 5003, and an input control unit 5004 thereon.

When the power switch 5112 is on, the power unit 5006 is supplied power from the external power unit 5007, and supplies the power to each unit of the personal computer and charges the battery 5008. If there is no supply from the external power unit 5007 (for example, not connected), it supplies power from the battery 5008 to each unit.

In contrary, when the power switch 5112 is off, the power unit 5006 supplies power from the battery 5008 only to the control board 5001 whether or not it is supplied power from the external power unit 5007. During the time, the entire operation of the personal computer looks in the stopped state with no display on the display device 5105 and no operation in the external storage unit 5005.

However, such data necessary to resume the execution of a program which was running at the time it was powered off as those stored in the memory 5102 or registers in the CPU 5101 is retained even after the switch 5112 has been turned off because the control board 5001 is supplied power from the battery as mentioned.

When the user turns on the power switch 5112 again at a later time, the display device 5105, the input device 5106, and the external storage unit 5005 are supplied power by the power unit 5006, and the unit 5005 and other units are initialized. Consequently, the previous screen is again displayed on the display device 5105 based on the graphic display data stored in the memory 5102, for example, thus, the state before the powering off operation is resumed, thereby, enabling the user to restart his operation.

Some of the Large Scale Integrated Circuits (LSIs) which are recently used as a CPU, a memory, or a control unit for an external unit have a mode called low power mode or sleeping mode in which the LSIs do not operate actively but just hold data by consuming just a small amount of power. Such LSIs can be used to more easily extend the period of time that data is retained after powering off operation, by using them in the low power mode after the powering off, and in the normal power mode after the powering back on.

Disclosed in U.S. Pat. No. 4,907,150 and others is a construction in which data stored in a memory or registers in the CPU is transferred to another memory backed up by a battery though the power supply to the CPU or the memory is stopped by powering off. According to this approach, it becomes easier to select a high-speed or compact device as the CPU or memory, without considering power demand.

However, such construction disclosed in the above references requires a memory with a larger capacity due to the massive data to be transferred thereto, therefore enlarging the hardware as well as raising manufacturing cost. Such a disadvantage appears considerably on the window system constructed so as to display windows on a bit-map-display.

Furthermore, the construction can not be applied to high-speed computer systems such as workstations, because they have large power demand and many of the LSIs used for them do not have the above mentioned low power mode. Therefore, for example, a battery having the capacity to retain a resumable state of a personal computer for a week can retain that of a workstation only for an hour. Also, such computer systems having a large capacity of the memory would require a large amount of power to retain the entire data in the low-demand memory to be transferred.

Limited resumable period of time gives a great restriction to the practical operations of workstations and other systems because they are mainly for business use so that it causes a severe damage to the users to lose stored data.

Another disadvantage is that some programs can not restart their operations even if system has returned to the previous status once the power is off. For example, in a program to communicate with another computer system, the opposite party cancels the communication at the time the powering off operation, where the resume function which unconditionally powers off, has a reverse effect to a smooth operation. Also, cancelling such a useless program resumption is nothing but a waste of time.

SUMMARY OF THE INVENTION

The present invention has an object to provide a method and an apparatus employing a Storing device with a reduced capacity in which data necessary to resume a software application before powering off a computer system are stored.

The above object is fulfilled by a control unit of a computer system comprising a first storing device for holding written data while the power is on, a second storing device for holding the written data even when the power is off, and a power-off preserving device for powering off the system after transferring the data held in the first storing device to the second storing device.

The control unit may further comprise a window system processing device for refreshing the graphic display by producing the graphic display data based on the original data for the graphic display, a power-on resuming device for returning the data held in the second storing device to the first storing device, and a refresh requesting device for requesting the window system processing device to refresh graphic display after the data has returned to the first storing device.

The above object is also fulfilled by a method of controlling a computer system comprising the steps of powering off the system after transferring the data held in the first storing device for holding written data while the power is on to the second storing device for holding the written data even when the power is off, refreshing the graphic display by producing the graphic display data based on the original data for the graphic display, returning the data held in the second storing device to the first storing device, requesting the window system processing device to refresh graphic display after the data has been returned to the first storing device.

Above construction makes it possible to resume the graphic display data based on original data stored in the second storing device so that transmission of the graphic display data to the second storing device becomes unnecessary, thereby reducing the capacity thereof.

The present invention has another object to provide a method and an apparatus which enable the user to restart the program without cancelling the useless program resumption.

The object is fulfilled by a control unit of a computer system comprising a resuming device for resuming the execution of a program which was running before the powering off operation by resuming the previous status of a storing device containing registers in CPU, registers in input/output units, and the volatile storing device it was before the powering off operation, a system status holding device for holding information indicating the status of the computer system, a non-resumable condition holding device for holding non-resumable condition according to which the previous process substantially can not be resumed once the power is off even through the stored contents in the storing device has been resumed at powering on, a non-resumable condition judging device for judging whether the status of the computer system meets the non-resumable condition or not when the powering on operation is directed, and a program execution terminating device for terminating the program execution when the computer system is judged by the non-resumable condition judging device to meet the non-resumable condition.

The object is also fulfilled by a control unit of a computer system comprising a first storing device for holding written data while the power is on, a second storing device for holding the written data even when the power is off, a power-off preserving device for powering off the system after transferring the data held in the first storing device to the second storing device, a window system processing device for refreshing the graphic display by producing the graphic display data based on the original data for the graphic display a power-on resuming device for returning the data held in the second storing device to the first storing device, a refresh requesting device for requesting the window system processing device to refresh graphic display after the data has returned to the first storing device, a system status holding device for holding information indicating the status of the computer system, a non-resumable condition holding device for a holding non-resumable condition according to which the previous process substantially can not be resumed once the power is off even if the stored contents in the storing device has been resumed at powering on, a non-resumable condition judging device for judging whether the status of the computer system meets the non-resumable condition or not when the powering on operation is directed, and a program execution terminating device for terminating the program execution when the computer system is judged by the non-resumable condition judging device to meet the non-resumable condition.

Further the object is fulfilled by a method of controlling a computer system comprising the steps of powering off the system after transferring the data held in the first storing device for holding written data while the power is on to the second storing device for holding the written data even when the power is off, refreshing the graphic display by producing the graphic display data based on the original data for the graphic display, returning the data held in the second storing device to the first storing device, requesting the window system processing device to refresh graphic display after the data has returned to the first storing device, judging whether the status of the computer system meets the non-resumable condition or not when the powering on operation is directed, and terminating the program execution when the computer system is judged by the non-resumable condition judging device to meet the non-resumable condition.

Constructed as above, the system judges the operation thereof in order to ensure the program re-execution.

The present invention has another object to provide a apparatus capable of suspending and resuming a software application running on a computer system during a power off/on cycle with no limit of the power off period, and of selecting devices such as a CPU applied to the computer system even without a low power mode, thereby, reducing the size, weight, and producing cost of the computer system.

The above object is achieved by a control unit of a computer system comprising a first storing device for holding written data while the power is on, a second storing device for holding the written data even when the power is off, and a power-off preserving device for powering off the system after transferring the data held in the first storing device to the second storing device the first storing device may include registers in CPU, registers in input/output control units, and a volatile storing device. The second storing device may include a non-volatile storing device.

With the above construction, the data therein held before the powering off operation is retained without consuming any power so that the previous status where it was before the powering off can be resumed at the powering on operation regardless of the time period of power-off. Moreover, it becomes easier to reduce the size, weight, and producing cost of the computer system.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6(a) and 6(b) are block diagrams showing the functional construction of the program routine of Embodiment 1;

FIG. 8 is an illustration showing an example of the display on the display device of Embodiment 1;

FIG. 12 is an illustration showing an example of the display of Embodiment I at the powering on;

FIG. 15 is an example of window system identifying condition of Embodiment II;

FIG. 16 is a flow chart depicting the operation performed when the power switch of Embodiment II has been turned on;

FIG. 18 is an example of a program execution condition table of Embodiment III;

FIG. 19 is an example of a non-resumable program identifying condition of Embodiment III;

FIG. 21 is a flow chart depicting the operation of the system of Embodiment III performed at the powering on;

FIG. 22 is an illustration showing an example of the display of Embodiment III at the powering on;

FIG. 25 is a flow chart depicting the operation of the system of Embodiment III at the powering on.

DESCRIPTION OF THE PREFERRED EMBODIMENT

<Embodiment 1>
(The construction of the hardware)

Figure 1A:
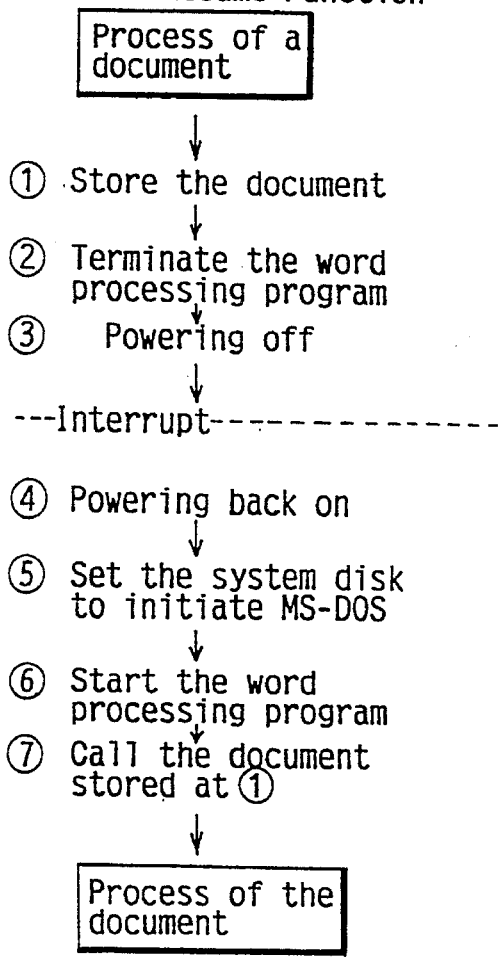
FIGS. 1a and 1b show examples of the operation of the user depending on the existence and nonexistence of the resume function of a computer system.
Figure 1B:
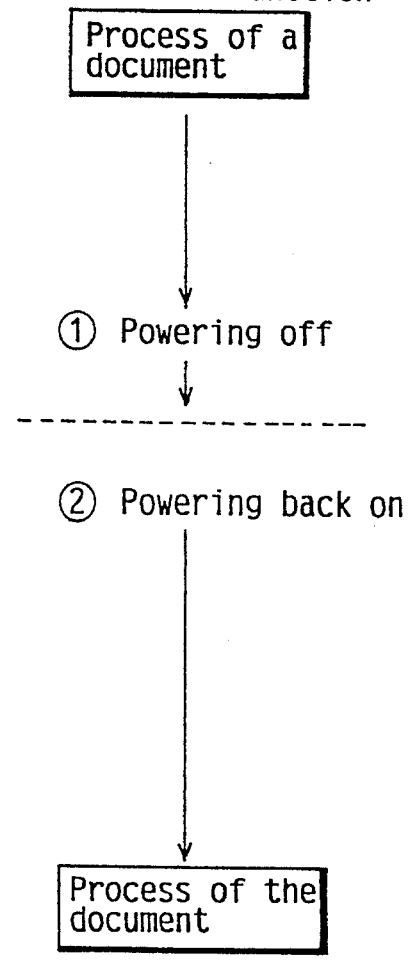
Figure 2:
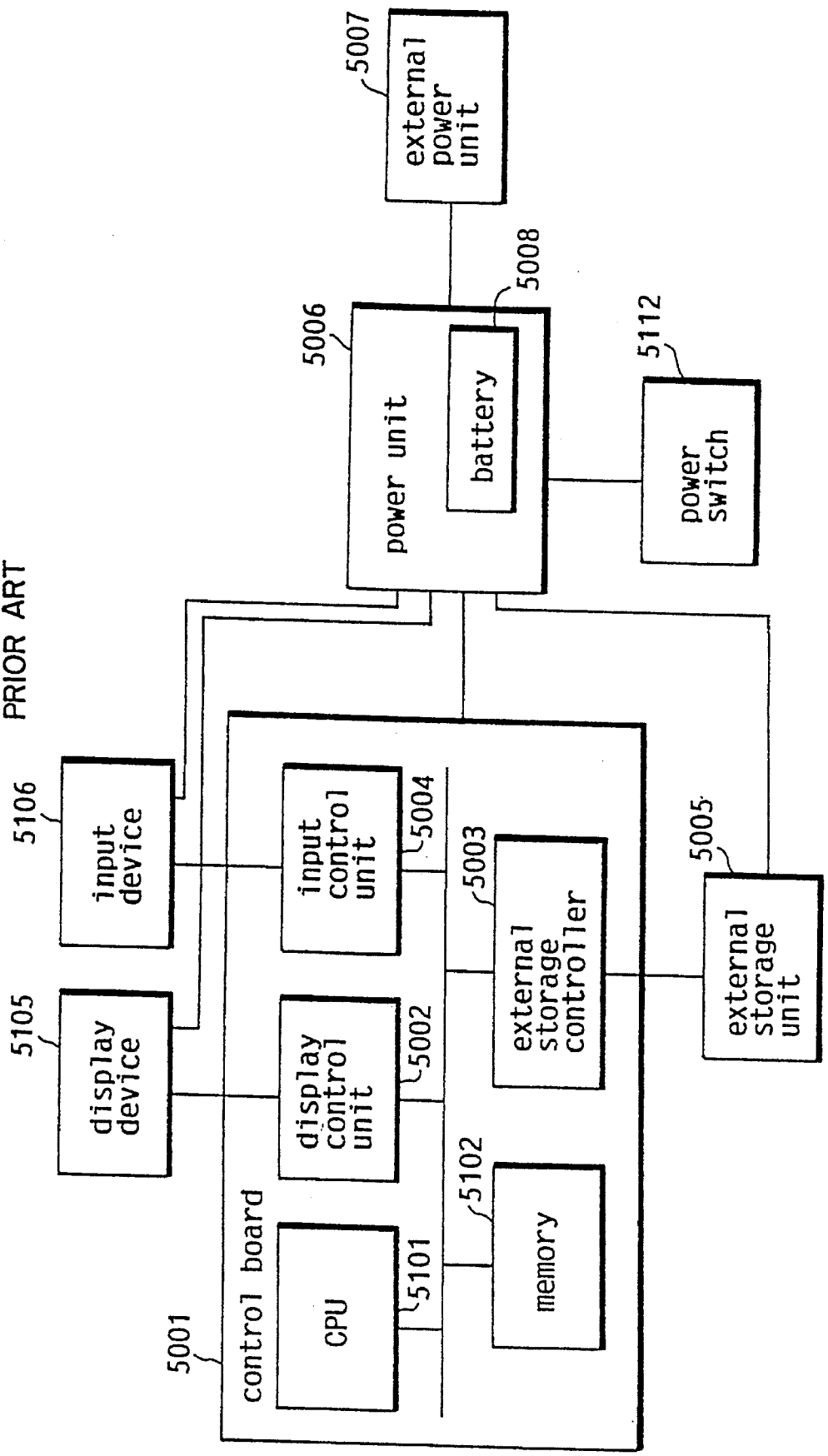
FIG. 2 is a block diagram of the surmised hardware construction of a conventional computer system.
Figure 3:
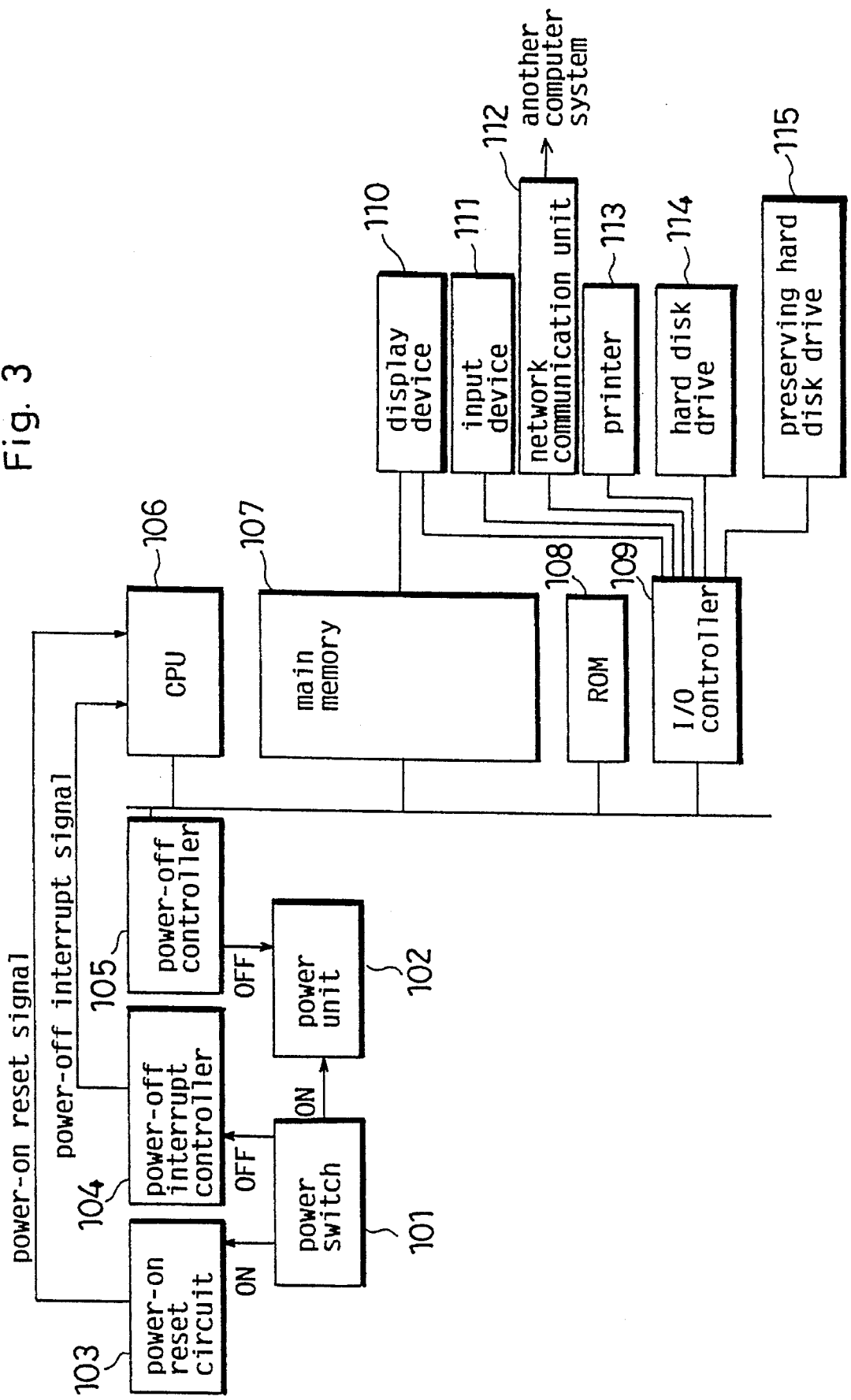
FIG. 3 is a block diagram of the hardware construction of the computer system of Embodiment 1.

The computer system of this embodiment is, as shown in FIG. 3, provided with a power switch 101, a power unit 102, a power-on reset circuit 103, a power-off interrupt controller 104, and a power-off controller 105.

The power switch 101 does not connect or disconnect the power line directly, but outputs on/off signals according to directions. The power unit 102 supplies power to each unit of the system when inputted with an on-signal from the power switch 101, and stops the supply when inputted with an off-signal from the power-off controller 105.

A CPU 106 is receives both a power-on reset signal outputted from the power-on reset circuit 103 and a power-off interrupt signal outputted from the power-off interrupt controller 104. The computer system is also provided with a memory 107, a ROM 108, and an I/O controller 109 all of which, the power-off controller 105 and the CPU 106 being connected with each other via bus lines.

The I/O controller 109 controls a display device 110, an input device 111, a network communication unit 112, a printer 113, a hard disk drive 114, and a preserving hard disk drive 115 to carry out data input/output operation among these units. The graphic display data to display images on the display device 110 is directly inputted from the memory 107. The I/O controller 109 is provided with internal registers including a baud rate register for holding information indicating the communication speed with the input device 111, and a Hard Disk (HD) transfer mode register for holding information indicating the data is transferred to/from the hard disk drive 114 on synchronous mode or another.

(The construction of a register set in CPU 106)

Figure 4:
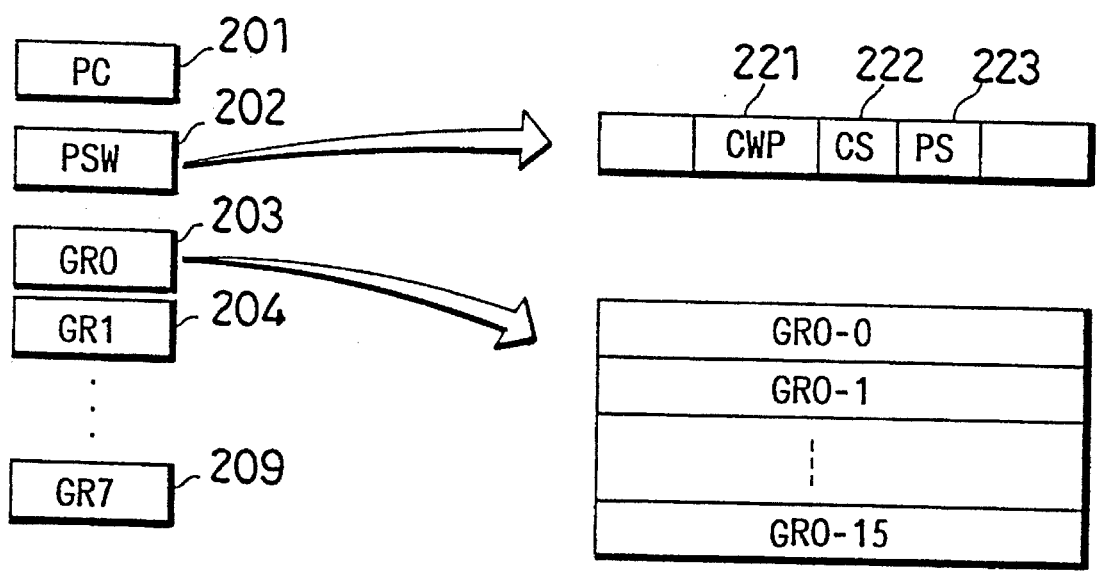
FIG. 4 is an illustration showing the construction of the register set in the CPU of Embodiment 1.

The CPU 106 is, as shown in FIG. 4, provided with a program counter (PC) 201, a register for a processor status word (PSW) 202, general purpose register groups (GRO) 203–209 each of which consists of 16 registers. The PSW 202 includes these fields holding a current window pointer (CWP) 221 indicating the GR in use among the GR 203–209, holding a current status (CS) 222 indicating the current mode state of the CPU 106, and holding a previous status (PS) 223 indicating the mode state of the CPU 106 at the time an interrupt has occurred. The above mode state includes a supervisor mode in which the execution of privileged instructions or memory accesses associated with the system control is allowed, and a user mode in which the execution is not.

(The memory map of the memory 107)

Figure 5:
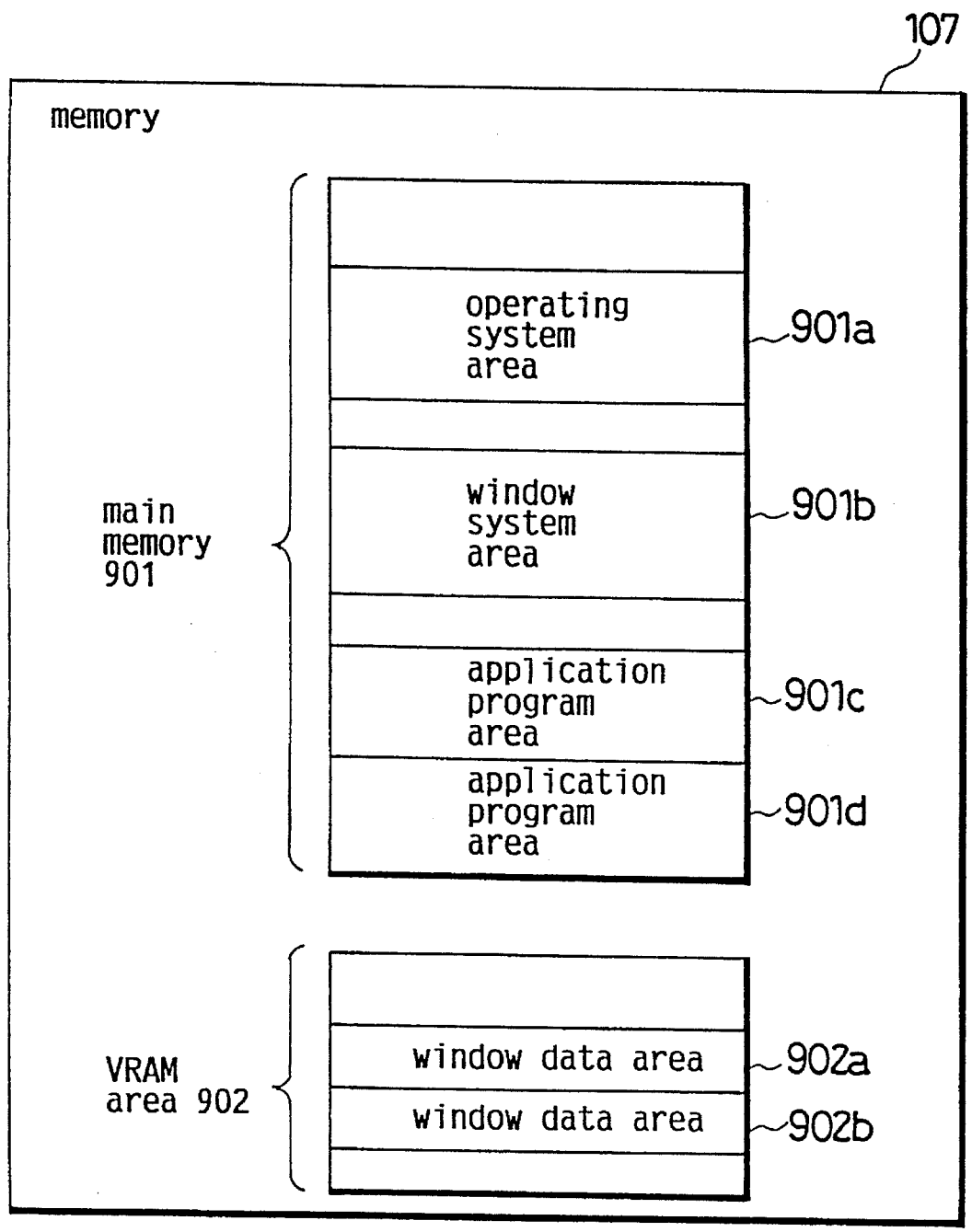
FIG. 5 is an example of the memory map of the main memory of Embodiment 1.

In the memory 107 consisting of a RAM, a main memory 901 and a VRAM area 902 are reserved as shown in FIG. 5.

The main memory 901 includes an operating system area 901a, a window system area 901b, and an application program areas 901c/901d . . . In the operating system area 901a, operating system programs, a memory management table for managing the use of the memory 107, a process control table for managing the state of a running program and the like are stored. In the window system area 901b, window system programs, various data including the number of the windows opened or indicated on the display device 110, the sizes and positions of each window are stored. In the VRAM area 902, window data areas 902a/902b . . . and the like holding the graphic display data of the images displayed on a window and the like are reserved when the window is opened.

(The functional construction of the program routine)

The computer system operates by the execution of the program routine stored in the memory 107 or the ROM 108.

This routine is divided into functional units to make the description easier.

As shown in FIG. 6(a) a power-off processing unit 3001 is initiated by the input of a power-off interrupt signal from the power-off interrupt controller 104, and directs the power-off controller 105 to output a power-off reset signal after a system status preserving unit 3002 has stored the data held in each register of the CPU 106, the memory 107, the internal registers of the I/O controller 109, or the like to the preserving hard disk drive 115. It should be noted that the memory in the VRAM area 902 are excluded in the above procedure. The unit 3001 also sends control information to a print processing unit 303 which controls the printing operation of the printer 113 to avoid the troubles caused by powering off during the printing process.

A power-on processing unit 4001 is initiated by the input of a power-on reset signal from the power-on reset circuit 103, and transfers control to the routine which was running at the time the powering off operation, after a system status resuming unit 4002 has set the data stored in the preserving hard disk drive 115 to each of the registers in the CPU 106 and another unit. The unit 4001 also sends, if necessary, control information to a process control unit 301 for managing the process of an application program in execution, to a window system processing unit 302 for managing the window displayed on the display device 110, and to the print processing unit 303 in order to avoid the troubles caused from the exact resuming of the status it was before the powering off.

With the control information, the window system processing unit 302 refreshes the graphic display data stored in the VRAM area 902 at the powering back up. For this purpose, the power-on processing unit 4001 has a construction as shown in FIG. 6(b).

A refresh request flag setting unit 4003 is initiated with the system status resuming unit 4002 while the data from the preserving hard disk drive 115 are stored in the memory 107, and subsequently sets the refresh request flag indicating the necessity to refresh the graphic display data stored in the VRAM area 902 in an area within the operating system area 901a. Having (sensed) the setting in accordance to a timing, a refresh requesting unit 4004 issues the refresh request to the window system processing unit 302. More precisely, the window system processing unit 302 calls a library function stored therein for the refresh purpose.

The description of the other units is omitted because they are the same as those provided in the conventional computer systems. They include the following units: a boot processing unit for activating the system at the time the powering on without resuming the data saved to the preserving hard disk drive 115, an initializing processing unit for initializing the I/O controller 109 and the like, an operating system processing unit for executing an operating system program, an application processing unit generated by loading an application program.

The operation of the computer system having the above construction is described as follows.

(Interrupt operation)

Interrupt operations are closely related with the operation of the power-off processing unit 3001 and the power-on processing unit 4001. They are initiated by the input of an interrupt signal such as the power-off interrupt signal to the CPU 106 or by the execution of a software interrupt instruction.

When an interrupt has occurred, the CPU 106 performs the following internal procedure before transferring control to the interrupt processing program.

(1) Shift the GR in use by incrementing the value of the CWP 221 for the interrupt process program in order to save the value of each register of the GR used before the interrupt.
(2) Save the value of the PC 201 at the point of the interrupt occurrence which indicates the address of the area in which the instruction to be fetched next is preserved by moving, for example, to the 16th register of the GR indicated by the CWP 221. The value of PC 201 may be pushed to a stack.
(3) Move the value of the CS 222 to the PS 223, and transfer control to the interrupt processing program. More precisely, the CPU 106 sets the execution starting address of the interrupt processing program predesignated according to the types of the interrupt signals or the like to the PC 201 and executes the interrupt processing program by the instruction stored in the address area.

The process which was being executed before the interrupt occurrence is resumed by the execution of the interrupt returning instruction in the interrupt processing program.

The CPU 106 carries out the following internal procedure to return to the state where it was before the interrupt occurrence.

(1) Move the value of the PS 223 back to the CS 222 to retrieve its original value (the mode of the CPU is returned to the original).
(2) Move the address stored in the 16th register of the GR indicated by the CWP 221 to the PC 201.
(3) Decrement the value of the CWP 221 so that the GR used before the interrupt occurrence can be used.

Thus, the CPU 106 returns to the previous status where it was before the interrupt occurrence and resumes the execution according to the instructions stored in the address area indicated by PC 201.

(The operation performed subsequent to the powering on when the state of the system is not preserved)

The computer system of this embodiment can be powered off even without preserving the system status as described later.

Figure 7:
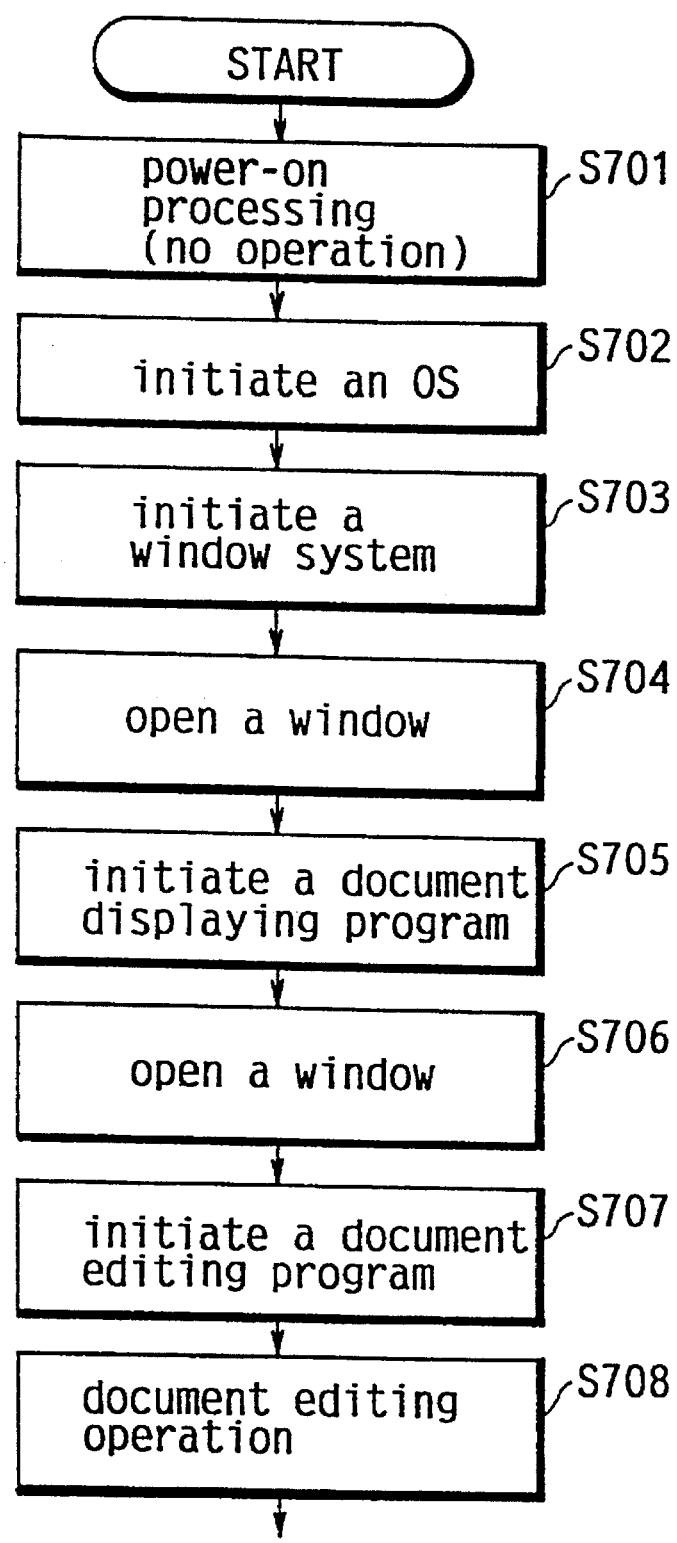
FIG. 7 is a flow chart depicting the operation performed at the powering on when the system status of Embodiment 1 is not preserved.

The operation of displaying and editing a document at the powering back on at a later time is described with reference to FIG. 7.

By turning the power switch 101 on, the power-on reset circuit 103 outputs a power-on reset signal, and the power-on processing unit 4001 is initiated (S701). The unit 4001 transfers control to the boot processing unit without initiating the system status resuming unit 4002 after confirming that the system status was not preserved in the preserving hard disk drive 115 at the previous powering off operation by checking the value of a resumable flag 601 stored in the drive 115 as described later. The boot processing unit initialized the I/0 controller 109 and other units by initiating the initializing processing unit, loads the operating system program from the hard disk drive 114 to the operating system area 901a, and transfers control to the operating system processing unit (S702). At this time, the operating system processing unit accepts input operation of the user.

According to the direction of the user to initiate the window system, the operating system processing unit loads the window system program to the window system area 901b to initiate the window system processing unit 302 (S703).

According to the direction of the user to open a window, the window system processing unit 302 displays a window 801 as shown in FIG. 8 (S704). At this time, the window system processing unit 302 stores the data including the position and size of the window 801 into the window system area 901b, and reserves a window data area 902a holding the graphic display data of the images displayed on the window 801 in the VRAM area 902.

According to the direction of the user to initiate a document displaying program within the window 801, the operating system processing unit reserves an application program area 901c, and loads the application program from the hard disk drive 114 in order to initiate the application processing unit (S705). According to the direction of the user to display a document preserved in the hard disk drive 114 before, the application processing unit displays the document within the window 801 by writing the graphic display data to the window data area 902a.

According to the direction of the user to open another window, the window system processing unit 302 displays the window 802 in the same manner as (S704), stores the data including the position and size of the window 802 into the window system area 901b, and reserves the window data area 902b holding the graphic display data of the images displayed on the window 802 in the VRAM area 902 (S706).

According to the direction of the user to initiate a document editing program within the window 802, the operating system processing unit reserves an application program area 901d in the same manner as the (S705), loads an application program from the hard disk drive 114, and initiates the application processing unit (S707).

According to the various directions of the user to edit a new document with reference to the document displayed on the window 801, the application processing unit processes the document editing, and displays it on the window 802 (S708) by writing the graphic display data to the window data area 902b.

A cursor 803 appeared on the window 802 in FIG. 8 indicates the displaying position of a character inputted from the input device 111.

(The operation performed before powering off with preserving the system status)

Figure 9:
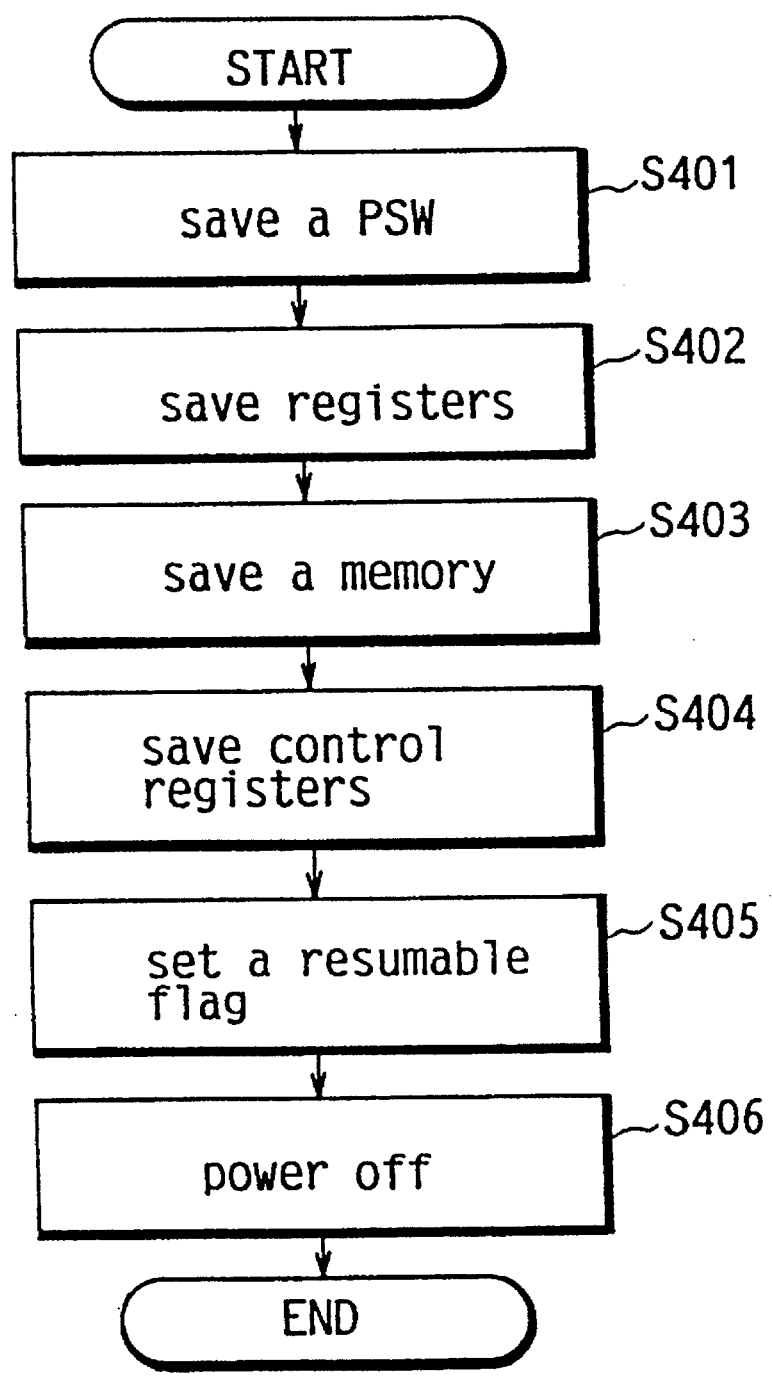
FIG. 9 is a flow chart depicting the operation performed at the powering off after the system status of Embodiment 1 has been preserved.

As shown in FIG. 9, when the power switch 101 is turned off, the power-off interrupt controller 104 outputs a power-off interrupt signal, by which the power-off processing unit 3001 is initiated as interrupt processing as described before, regardless of the status of the application program or the like, and starts the system status preserving unit 3002.

Figure 10:
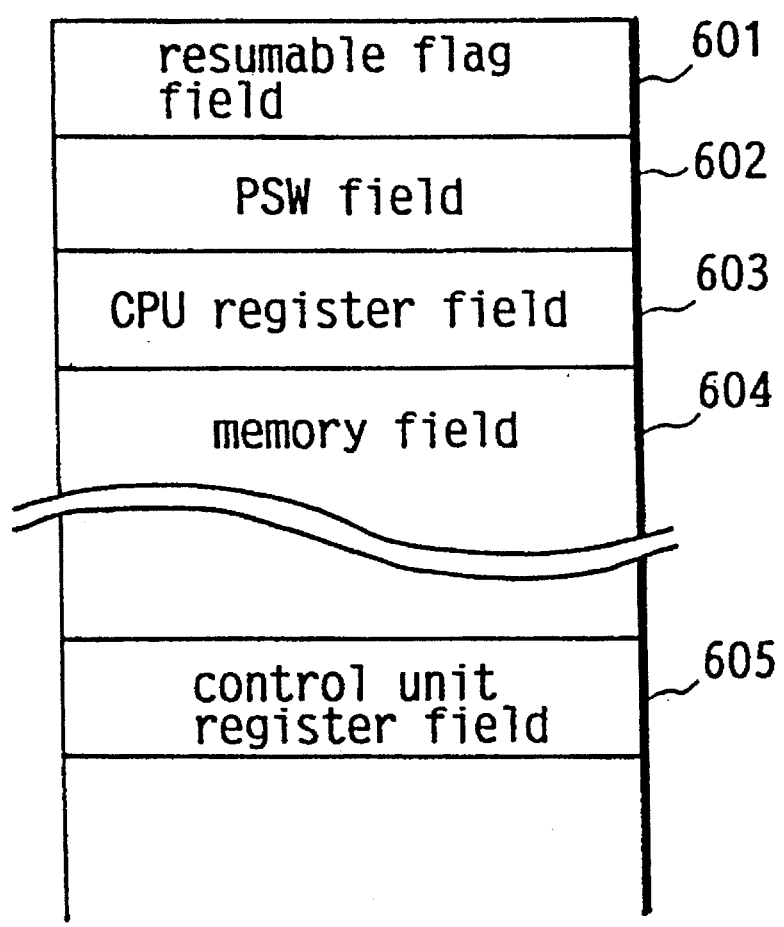
FIG. 10 is an illustration showing the memory map of the preserving hard disk of Embodiment 1.

The unit 3002 preserves the contents of the PSW 202 of the CPU 106 to the PSW field 602 of the preserving hard disk drive 115 shown in FIG. 10 (S401), and the contents of the GRs 203–209 to the CPU register field 603(S402). The address in the PC 201 is not stored because it is not needed to resume the system status. The address to be set in the PC 201 to resume the system status where it was before the powering off is held in the 16th register of GR by the internal procedure performed at the time of interrupt occurrence.

Next, the unit 3002 stores all the contents of the memory 107 to the memory field 604 (S403). However, the contents of the VRAM area are excluded in the procedure because they are re-constructible with the data stored in the application program areas 901c/901d or the like, the detail of which is described later. Only effective contents in the areas reserved by operating system processing unit, application processing unit or the like may be designed to be stored to the preserving hard disk drive 115 with reference to the memory control table held in the operating system area 901a.

The unit 3002 also stores the data necessary to resume the system status among those held in the internal register in the I/O controller 109 or the like to the control unit register field 605 (S404).

Later, the unit 3002 sets the value of the resumable flag field 601 to 1 in order to indicate that the system status is preserved, and returns control to the power-off processing unit 3001(S405).

The unit 3001 directs the power-off controller 105 to output a power-off signal. The power-off controller 105 outputs it to the power unit 102 which accordingly stops power supply to each unit of the computer system (S406).

(The operation performed subsequent to the powering on when the system status is preserved)

Figure 11:
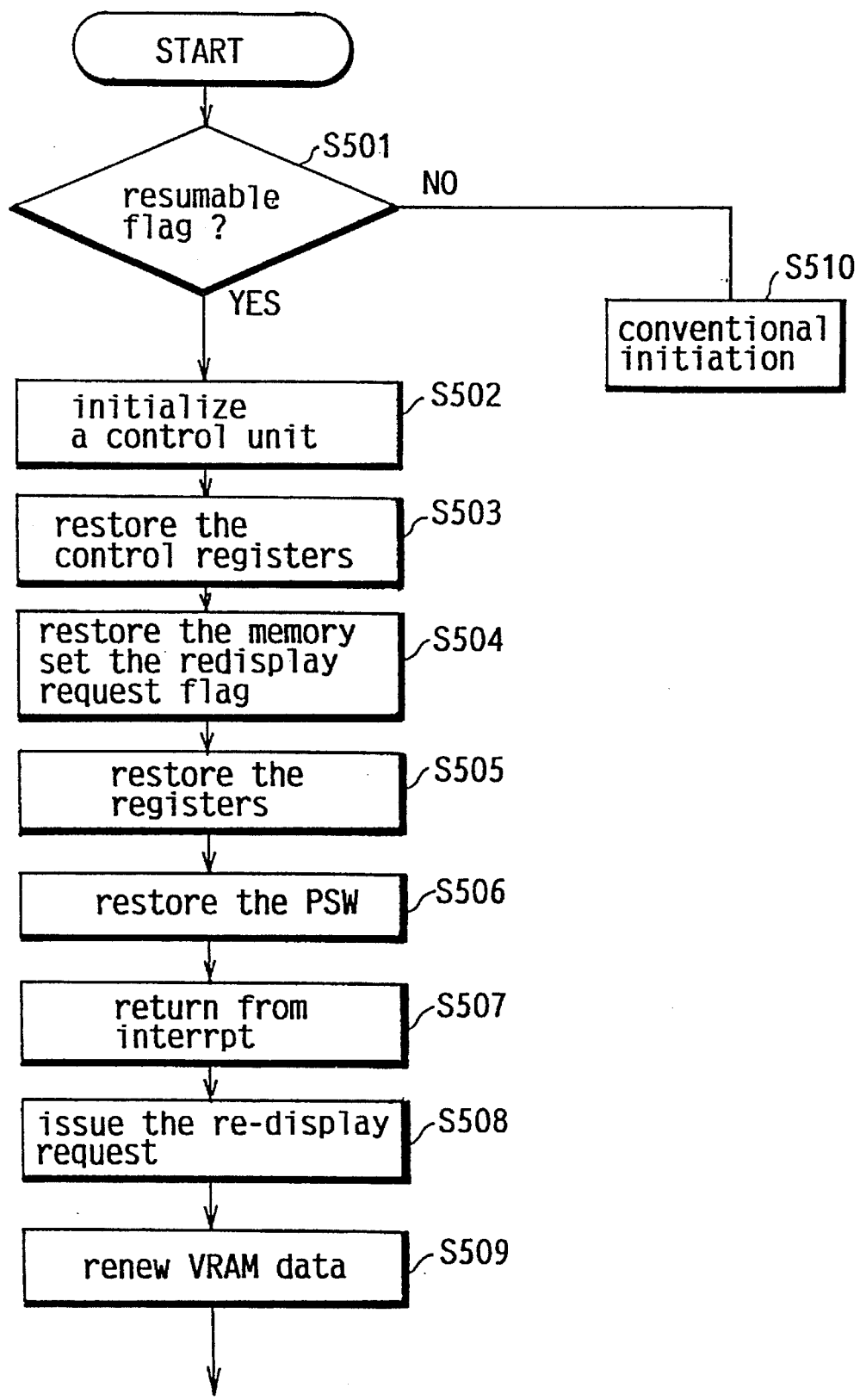
FIG. 11 is a flow chart depicting the operation performed at the powering on when the system status of Embodiment 1 is preserved.

As shown in FIG. 11, when the power switch 101 is turned on, it outputs a power-on signal to the power unit 102 and to the power-on reset circuit 103. The power unit 102 supplies power to each unit of the system. The power-on reset circuit 103 outputs a power-on reset signal to initiate the power-on processing unit 4001.

The unit 4001 first judges whether the value set in the resumable flag field 601 is 1 or not (S501).

If it is not, the unit 4001 passes control to the boot processing unit without starting the system status resuming unit 4002, and loading of the operating system program and the like is performed as described before (S510).

If it is 1, the unit 4001 first initiates the initializing processing unit to initialize the I/O controller 109 and the like (S502).

Then, the unit 4001 passes control to the system status resuming unit 4002 which subsequently reads the contents preserved in the control unit resister field 605 of the preserving hard disk drive 115 in order to set them in the appropriate internal register of the I/O controller 109 or the like (S503).

Figure 12:
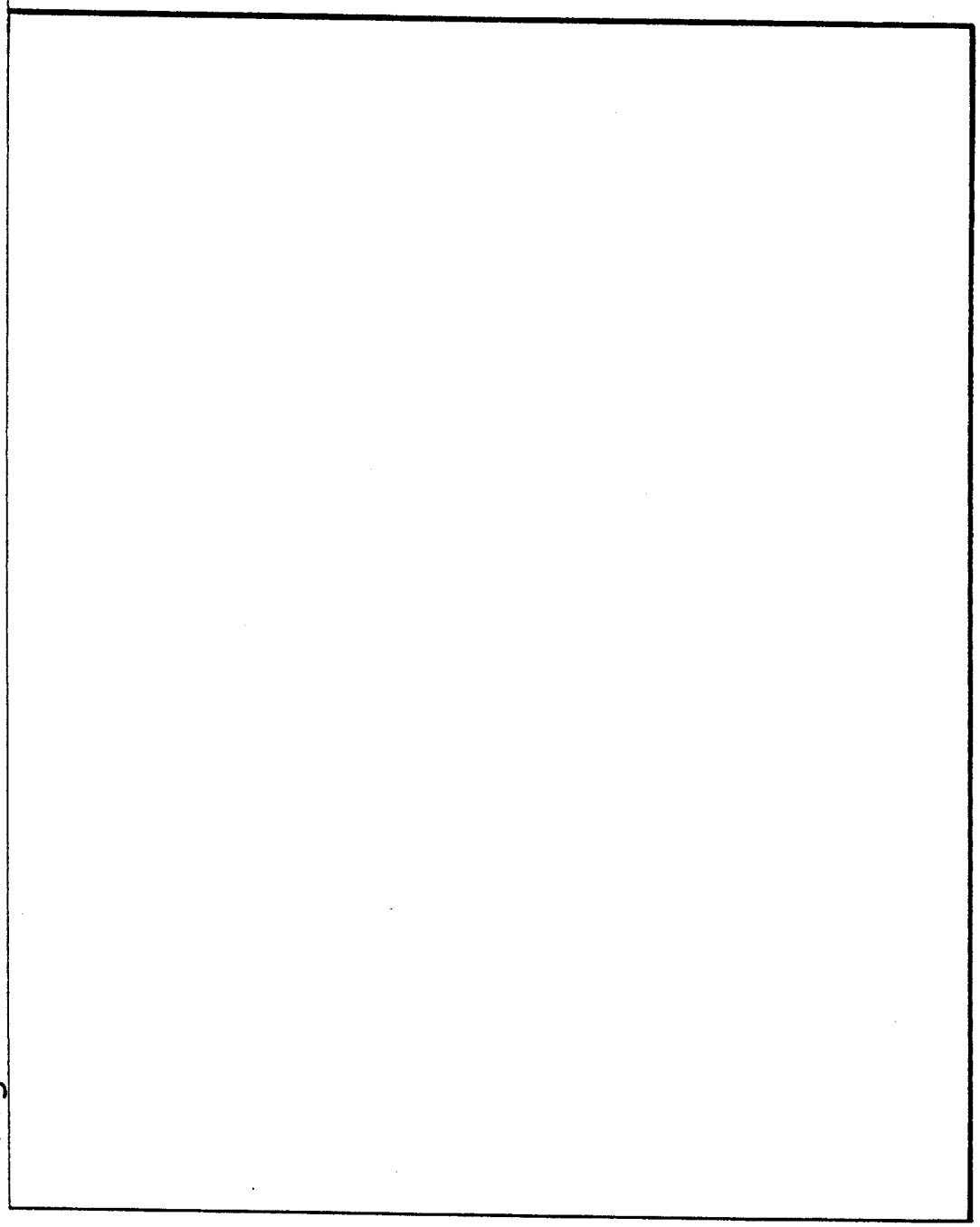

The system status resuming unit 4002 reads the contents preserved in the memory field 604 to store them to the memory 107 (S504). As previously mentioned, the contents of the VRAM area 902 are not resumed due to its non-preservation in the preserving hard disk drive 115, thus nothing appears on the display device 110 as shown in FIG. 12 even the graphic display data are read out from the VRAM area 902. Therefore, the unit 4002 initiates the refresh request flag setting unit 4003 to have it set the refresh request flag in an area within the operating system area 901a. Since the window system area 901b and the window data areas 902a/902b are resumed at this time, the display device 110 reads graphic display data from the memory 107 and displays the previous images which were being displayed before the powering off.

The unit 4002 subsequently reads the contents of the GRs 203–209 stored in the CPU register field 603 and sets them to the corresponding GRs 203–209 (S505).

The unit 4002 next reads the contents of the PSW 202 stored in the PSW field 602, sets them to the PSW 202 (S506) and returns control to the power-on processing unit 4001.

At this point, all the status except the address indicated by the PC 201, the contents of the VRAM 902, and the refresh request flag set within the operating system area 901a, return to the previous status where it was during the power-off processing unit 3001 being performing the interrupt process at the powering off. By the execution of return from interrupt instruction in the power-on processing unit 4001, the computer system returns to the previous status where it was before the power-off interrupt signal is inputted, thus, the execution such as application processing is resumed (S507).

In a later time such when control is transferred to the operating system processing unit to a timing at a task switching or the like, the operating system processing unit initiates the refresh requesting unit 4004 in the unit 4001, whereby it issues the refresh request to the window system processing unit 302 and resets the refresh request flag following its sensing of the refresh request flag setting therein.(S508)

Then the window system processing unit 302 reconstructs the graphic display data based on the original data such as documents, layout, and font data stored in the window system area 901*b* or application program areas 901*c*/901*d*, thereby renewing the contents of the VRAM area 902, window data area 902*a* and 902*b*(S509). The data reconstruction thus enables the display device 110 to display the image before the powering off by reading out the graphic display data from the VRAM area 902.

Thus, the data necessary for resuming the system status including the contents of the PSW 202 and GRs 203–209, the contents of the memory 107, the contents of the internal register of the I/O controller 109 are stored to the preserving hard disk drive 115 before the powering off, and are read therefrom to be set to the registers and the like, thereby, resuming the previous operation which was running before the powering off.

Moreover, the data reconstruction based on the original data at the system power back up contributes to reduction of the memory capacity for the data preservation.

Since the preserving hard disk drive 115 preserves data without power supply, there is no limit on the time period before the next powering on. For obtaining the same effects, a non volatile memory such as an electrically erasable PROM (EEPROM) and a flash memory, a magneto-optic disk drive, and a magnetic tape drive can be used instead of a hard disk drive.

(The operation performed before powering off when the system status is not preserved)

Figure 13:
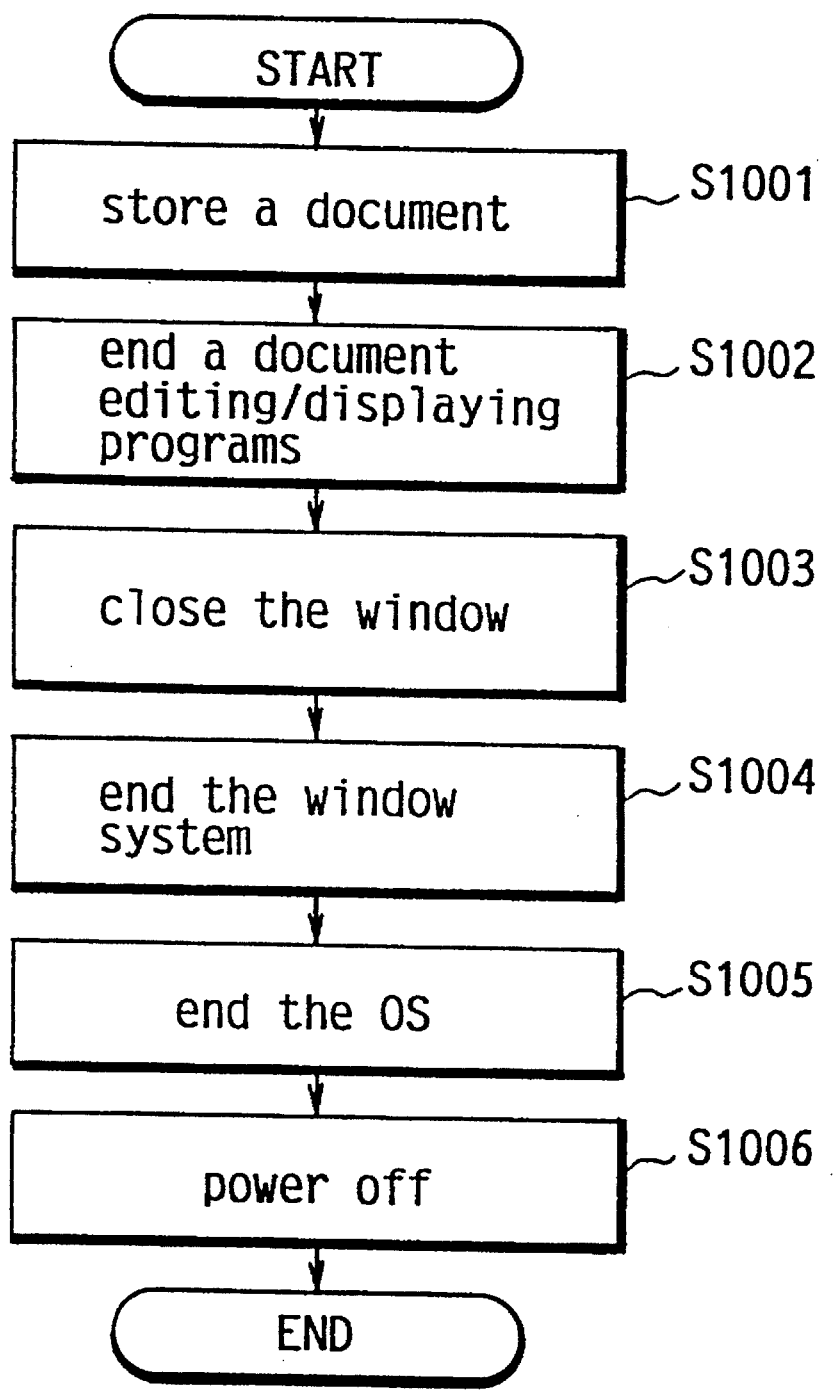
FIG. 13 is a flow chart depicting the operation at the powering off when the system status of Embodiment I is not preserved.

As shown in FIG. 13, when the computer system is powered off without saving the system status, it must be returned to the initial status as follows.

To prevent the system status from being preserved at the power off, the power-off processing unit 3001 is exchanged with another unit to direct the power-off controller 105 to output an off-signal without initiating the system status preserving unit 3002. More precisely, the instruction to direct the output of an off-signal or the like may be written in the address area where the execution starts when a power off interrupt has occurred.

The application processing unit stores the document in operation to the hard disk drive 114 according to the direction of the user (S1001), and ends the editing program and displaying program of the documents (S1002). At this time, the application program areas 901*c*/901*d* are released, and control is passed to the window system processing unit 302.

The window system processing unit 302 closes the windows 801 and 802 (S1003) to end the window system process according to the direction of the user (S1004). At this time, the window system area 901*b* and the window data areas 902*a*/902*b* are released, consequently control in transferred to the operating system processing unit.

The operating system processing unit ends the operating system process according to the direction of the user (S1005). At this time, the operating system area 901*a* is released, the computer system can start only the operating system processing unit according to the direction of the user, and the powering off processing unit 3001 according to the powering off interrupt signal.

Consequently, when the power switch 101 is turned off, the power-off processing unit 3001 sets the value of the resumable flag field 601 to 0 in order to indicate that the system status is not preserved, and directs the power-off controller 105 to output a power-off signal so that the power unit 102 stops power supply.

<Embodiment 2>

The computer system of Embodiment II can re-display the previous image when the system is powered back on regardless of the kinds of window system, which varies due to differences in library functions for production/deletion of the window system and display data refreshing as well as in interfaces such as display images and operation methods. It is for this reason that the system calls the refresh library function by using that for the window for the image resumption.

Figure 14:
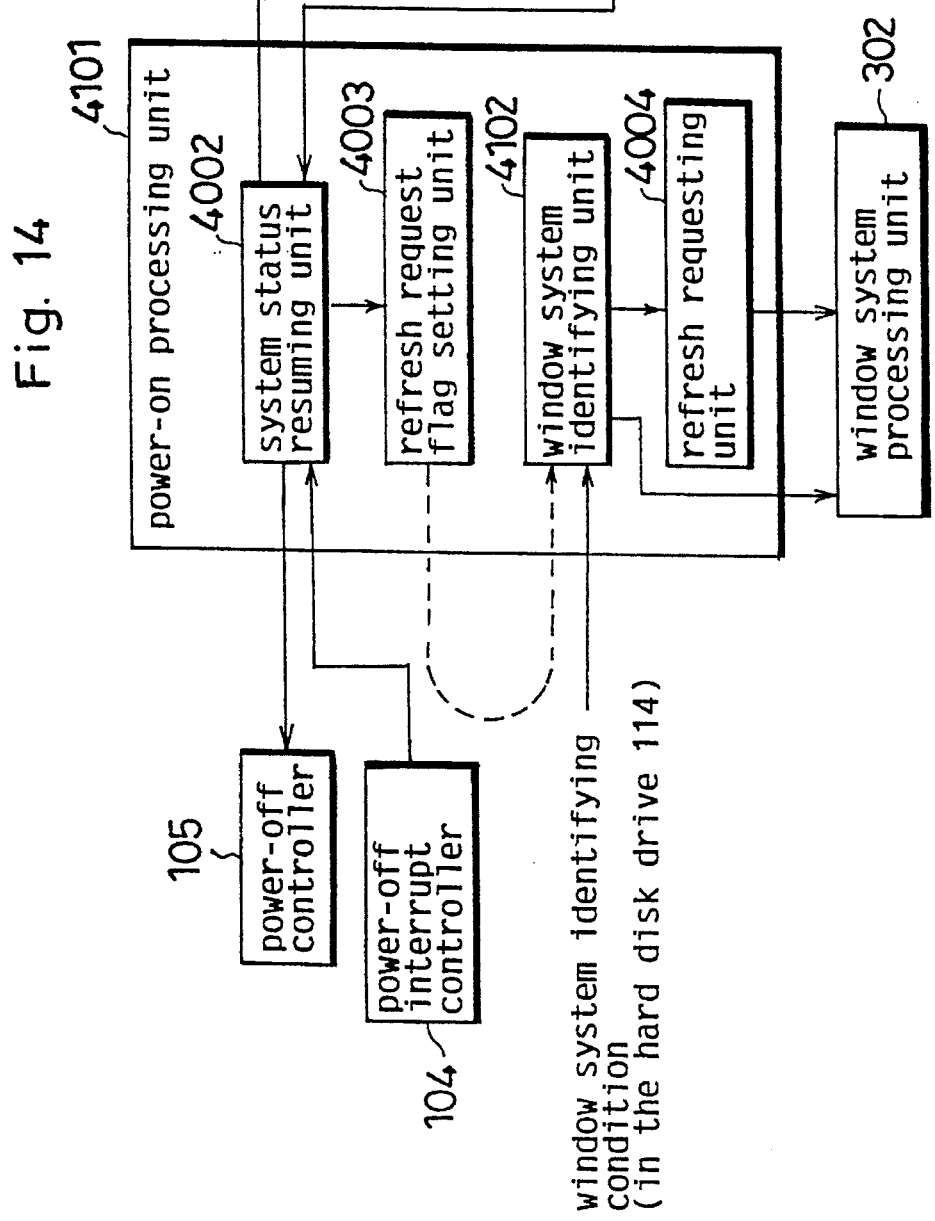
FIG. 14 is a block diagram showing the functional construction of the program routine of Embodiment II.

The system has the same construction as the one of Embodiment I except that a power-on processing unit 4101 as shown in FIG. 14 is installed instead of the power-on processing unit 4001.

(Detailed construction of the power-on processing unit 4101)

The unit 4101 has a window system identifying unit 4102 in addition to the construction of the 4001. The refresh request flag setting unit 4003 senses that the refresh request flag is set, meanwhile the window system identifying unit 4102 identifies the window system processing unit 302 based on window system identify conditions stored in the hard disk 114 as shown in FIG. 15.

More precisely, the window system identifying unit 4102 identifies X-window system when the return value is other than NULL at the activation of XOpenDisplay("NULL") function, while it identifies Sunview window system when the return value is 0 at the activation of we_getparentwindow(parent) function.

After the identification, the window system identifying unit 4102 transmits the identification to the refresh requesting unit 4004 to have it start, whereby it calls the library function for the refreshing display data corresponding to the identification.

(Operation of the system when the power switch 101 is on)

Figure 16:
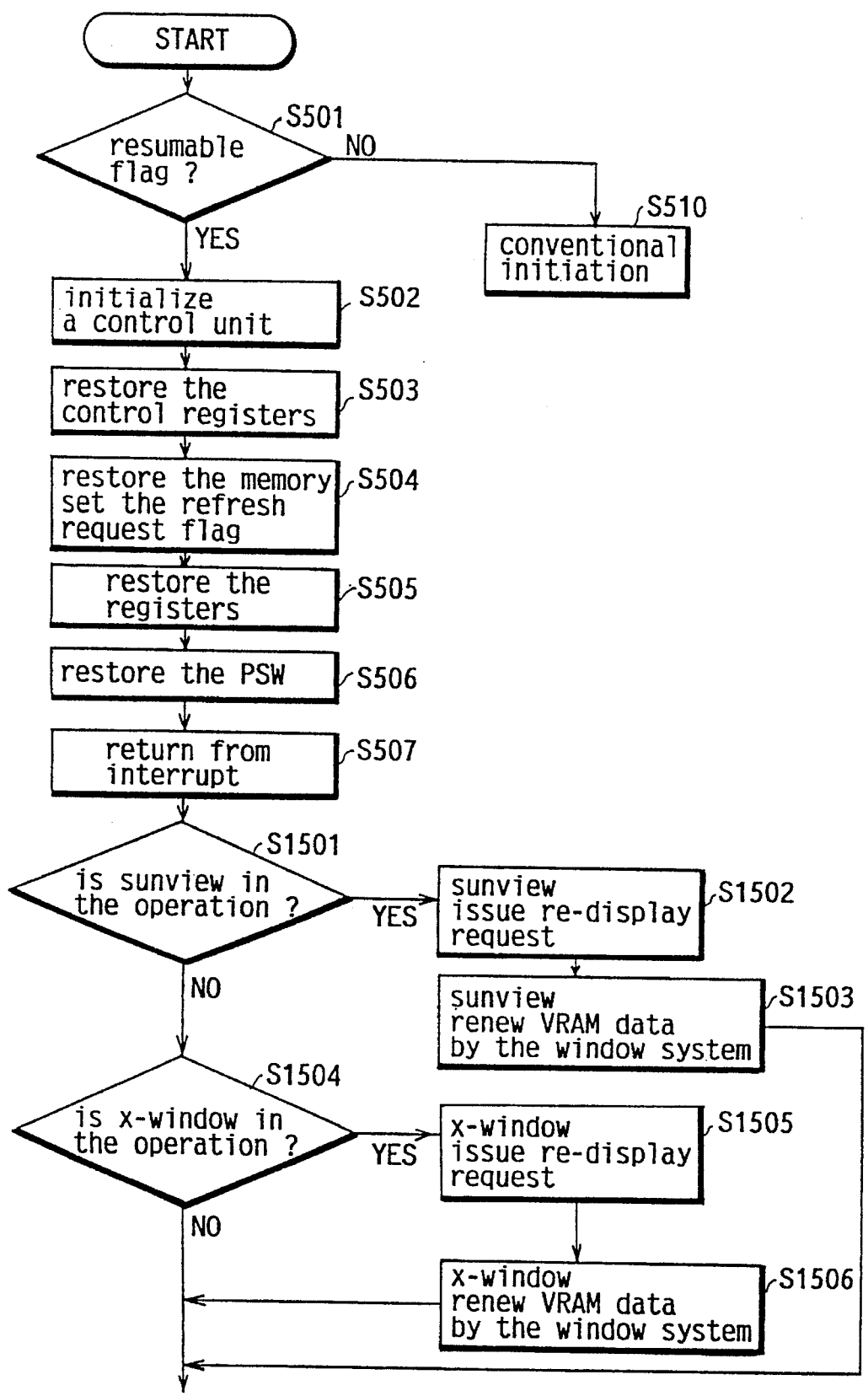

FIG. 16 shows the operation of the system when it is powered back on with the power switch 101 after the power off while X-window system was used.

The unit 4101 is initiated with the power switch 101 as described in the Embodiment I. Therefore, the 4101 restores the systems before the power off to restart the operation of the application process unit or the like(S501)–(S507), subsequently the refresh request flag setting unit 4003 sets the refresh request flag in the application process unit or the like. The window system restores its status before the power off, even though nothing is displayed on the display device 110.

The window system identifying unit 4102 is initiated with the operating system unit, then it reads out the window system identifying command from the hard disk drive 114. First it calls we_getparentwindow(parent) function in order to identify the operation of Sunview window system (S1501).

When it identifies the Sunview window system operation with the return value of 0, the refresh requesting unit 4004 issues a refresh request for Sunview window system to the window system process unit 302 (S1502), whereby it renews the contents of the VRAM area 902(S1503).

When it receives the return value other than 0, it calls XOpenDisplay("NULL") function in order to identify the operation of X-window system(S1504). Having received the return value other than NULL, the refresh requesting unit 4004 issues a refresh request for X-window system to the window system process unit 302 (S1505).

Based on original data such as documents, layout, and font data stored in the window system area 901b and application program area 901c/901d, the window system process unit 302 reconstructs the graphic display data, thereby renewing the window data area 902a and 902b in the VRAM area 902(S1506). The display device 110 then reads out the display data from the VRAM area 902, therefore displays the same image before the power off.

<Embodiment III>

The computer system of the Embodiment III has a function to automatically terminate the useless program resumption when the system is powered back on.

An application program communicating with another computer is taken up as an example. When the counter party controls the display by using the window on the screen as a virtual terminal, the original data are not preserved in the computer system, disabling the system to re-construct the contents of the VRAM area 902, therefore only displaying the window on the screen.

Figure 17:
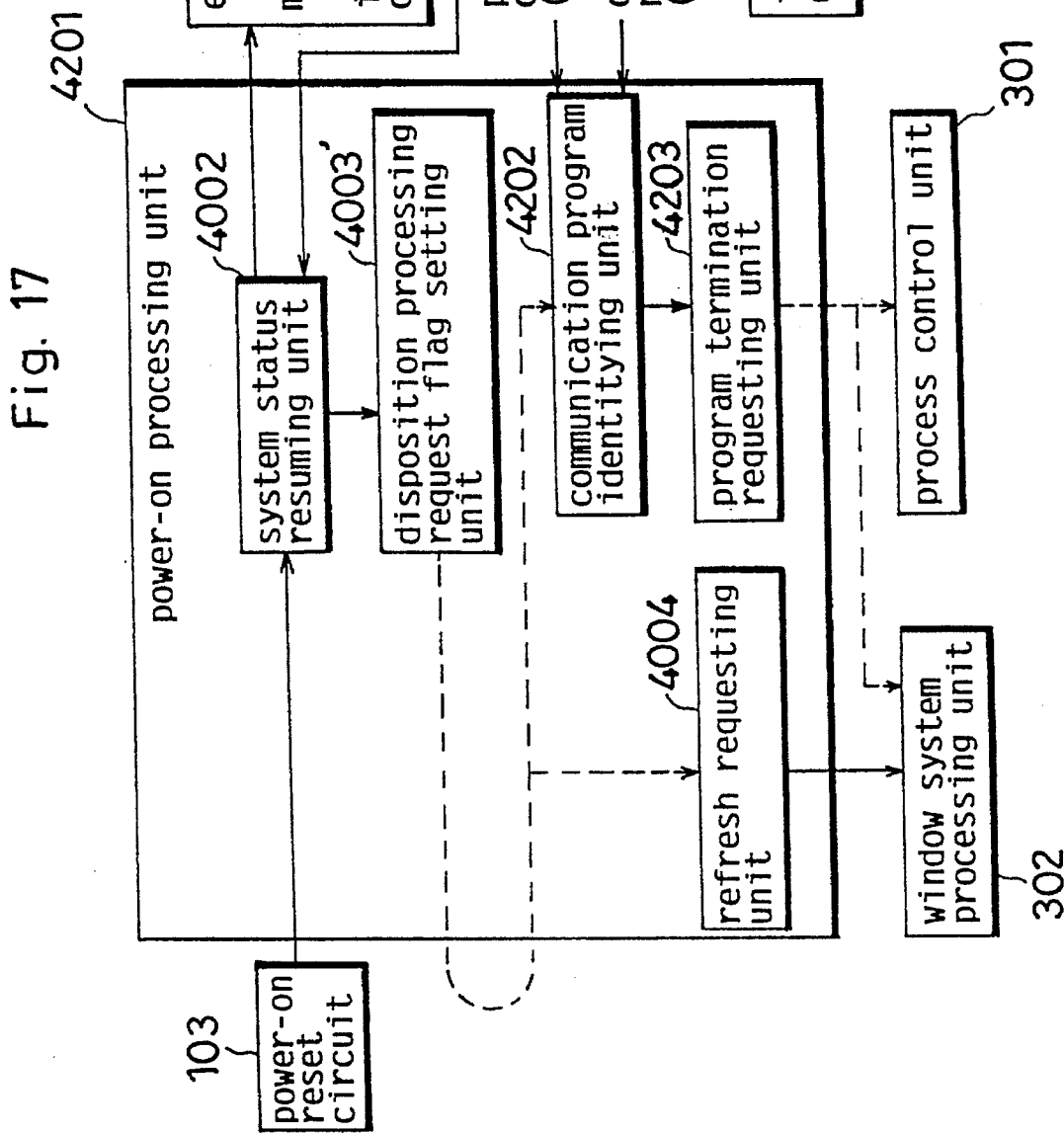
FIG. 17 is a block diagram showing the functional construction of the program routine of Embodiment 3.

The system has the same construction as the one of Embodiment I except that a power-on processing unit 4201 as shown in FIG. 17 is installed instead of the power-on processing unit 4001.

(Detailed construction of the power-on processing unit 4201)

The power-on processing unit 4201 comprises a communication program identifying unit 4202 and a program termination requesting unit 4203 in addition to the construction of the unit 4001, and a disposition processing request flag setting unit 4003' is installed instead of the refresh request flag setting unit 4003. Having been set the disposition processing request flag, the disposition processing request flag setting unit 4003' makes the refresh requesting unit 4004 issue the refresh request as well as have the communication program identifying unit 4202 identify the operation of the application program.

The unit 4202 sets the disposition request flag following its sensing of the disposition processing request setting in accordance to a timing.

If it identifies the operation of the application program, it initiates the program termination requesting unit 4203. Such identification is done based on a program execution condition table 1900 as shown in FIG. 18 and a condition for identifying non-resumable program 2000 as shown in FIG. 19.

Then the program termination requesting unit 4203 issues the termination request to the application program identified by the unit 4202.

(The program execution condition table 1900)

The program execution condition table 1900 is stored in the operating system area 901a.

The program execution condition table 1900 includes a process ID field 1901 and a command field 1902.

The process ID field 1902 maintains process IDs used for identifying the process of the program execution. The process IDs are assigned by a process control unit 301 when a process for program execution is produced.

The command field 1902 maintains the commands such as ones inputted by the operator with the input device 111 for the program execution.

Although the program execution condition table 1900 stores other data such as terminal reference numbers indicating the window opened as the virtual terminal in which the program in on the operation, description of these devices are omitted here since these are not the gist of the present invention.

(The condition for identifying the non-resumable program 2000)

The condition for identifying non-resumable program 2000 has been previously stored in, for instance, the hard disk drive 114. In FIG. 19, the program receiving the commands starting with "rsh" or "rlogin" are the non-resumable program. Also in FIG. 19, "*" denotes that any character or characters are applicable thereto. The communication condition may be the basis of the identification.

(The operation performed when the power switch 101 is on)

Figure 20:
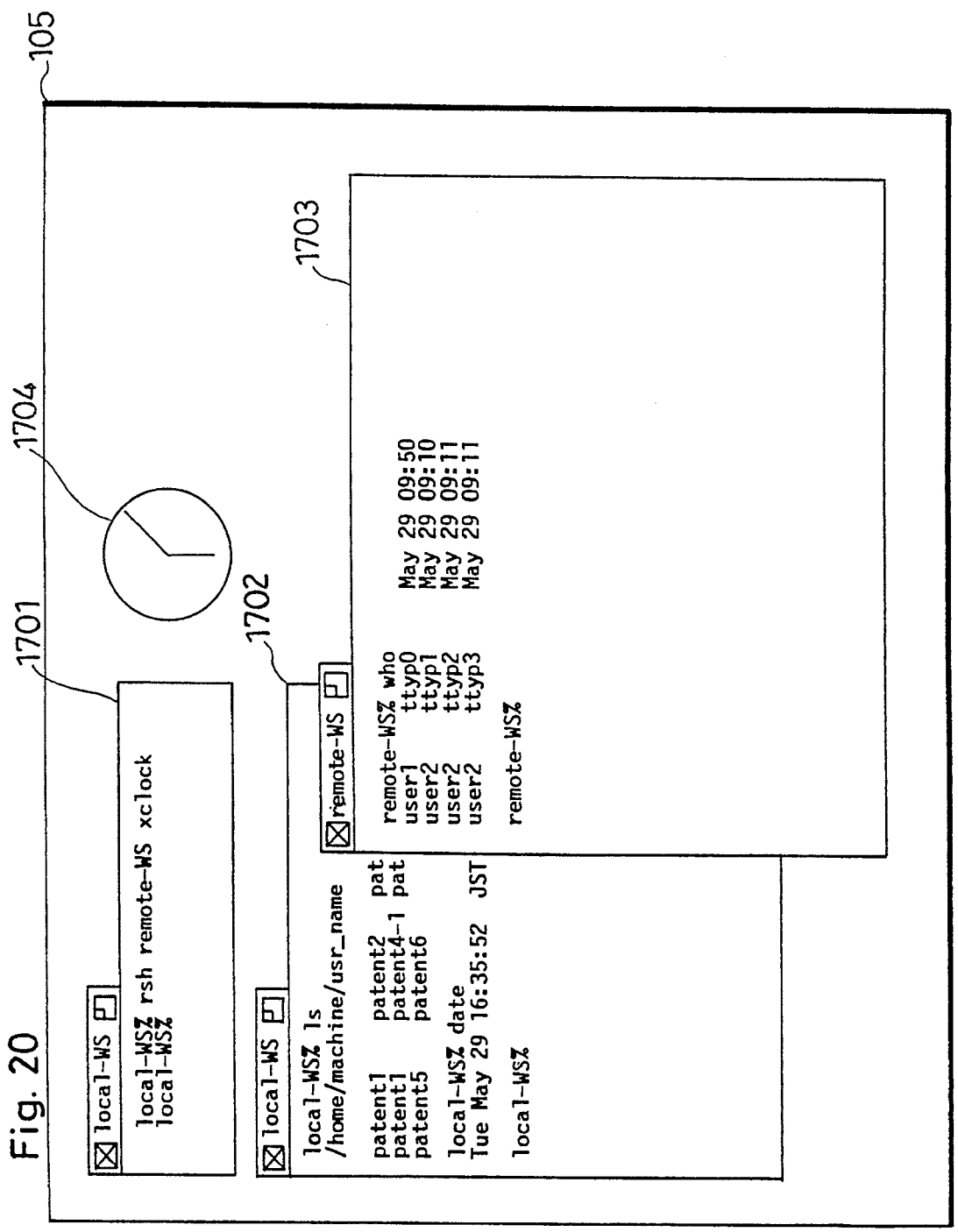
FIG. 20 is an illustration showing an example of the display on the display device of Embodiment III.
Figure 21:
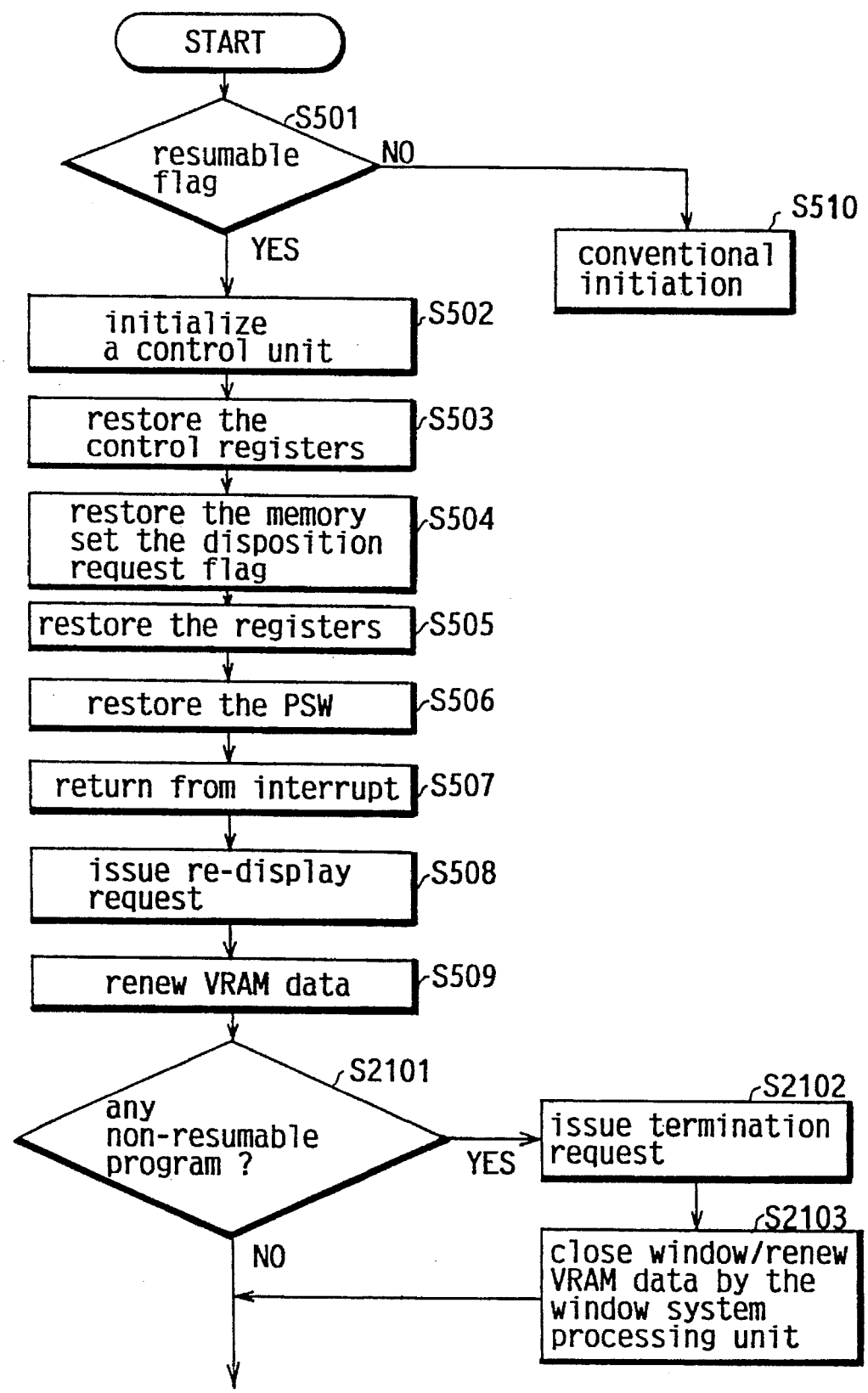

FIG. 21 describes the operation when the power switch 101 is on after having preserved the status of the system with three windows 1701, 1702, and 1703, and a clock 1704 as shown in FIG. 20 when the system was powered off. The external computer system controls the identification of the window 1073 and the clock 1704 via the network communication 112.

As in Embodiment I, the unit 4201 is initiated with the power switch 101 and in the meantime, the unit 4201 restores the status before the power off, restarting the application processing unit or the like(S501)–(S507). Subsequently, the disposition processing request flag setting unit 4003' sets the disposition processing request.

Figure 22:
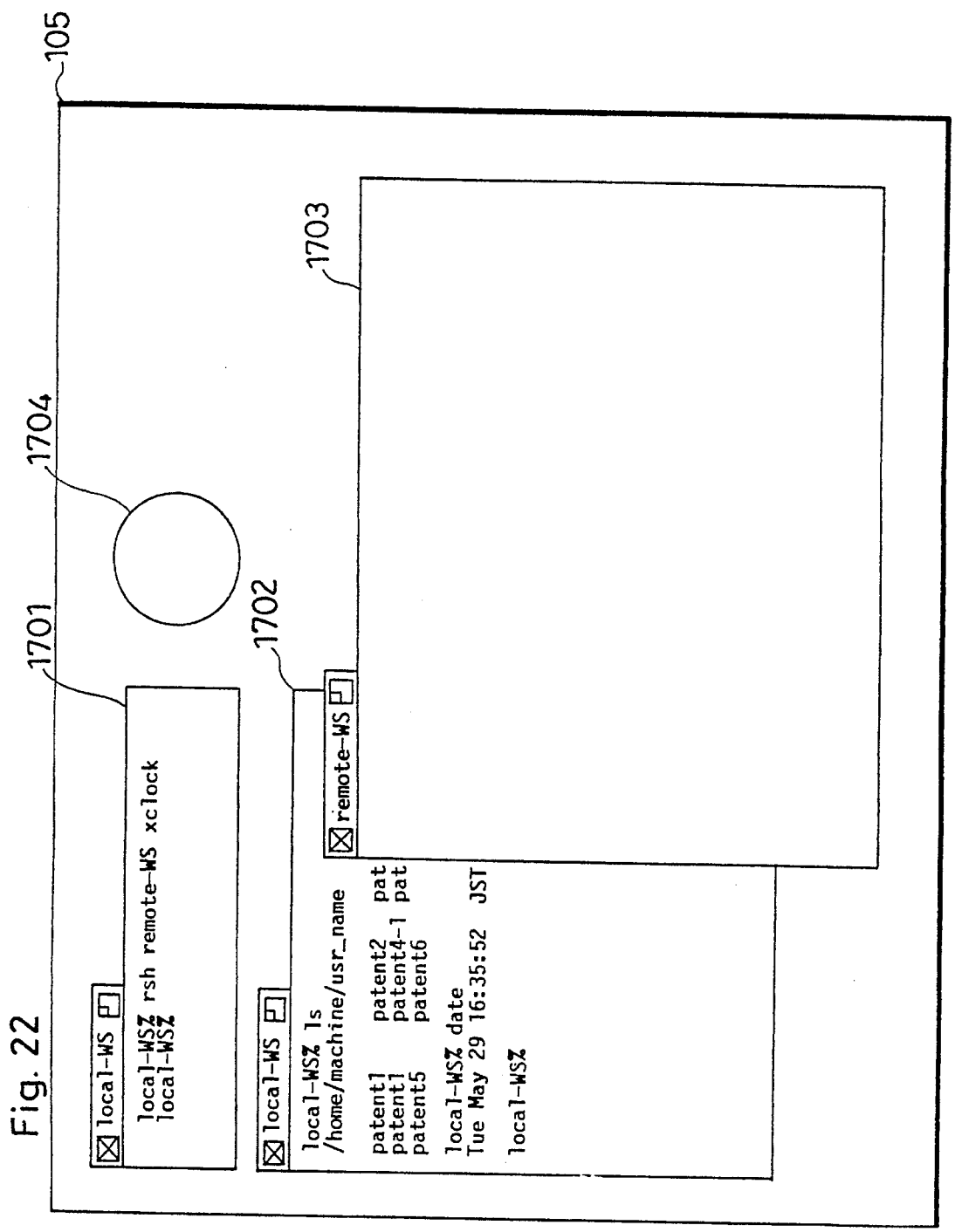

Initiated by the operating system processing unit, the refresh requesting unit 4004 senses the disposition processing request flag setting as in the same manner of Embodiment I, then issues the refresh request to the window system processing unit 302(S508). The window system processing unit 302 renews the contents of the VRAM area 902(S509), whereby the display device 110 reads out the graphic display data from the VRAM area 902 to display the substantially same image before the power off as shown in FIG. 22. However, nothing is displayed in the window 1703 and the clock, because the contents of the VRAM area 902 are not re-constructed as previously mentioned, and because the system is disconnected to the external computer systems controlling the terminal program and clock indication at the power off.

Initiated by the operating system processing unit, the communication program identifying unit 4202 senses the disposition processing request flag setting, upon which it identifies the non-operatable condition of the application program using the commands "rsh several xclock" in the process ID=140 and the application program with the commands "rlogin several" in the process ID=155 based on the program execution condition table 1900 and the condition for identifying non-resumable program unit 2000(S2101). Then the program termination requesting unit 4203 issues the termination request for the application program in response to the identification results(S2102).

Figure 23:
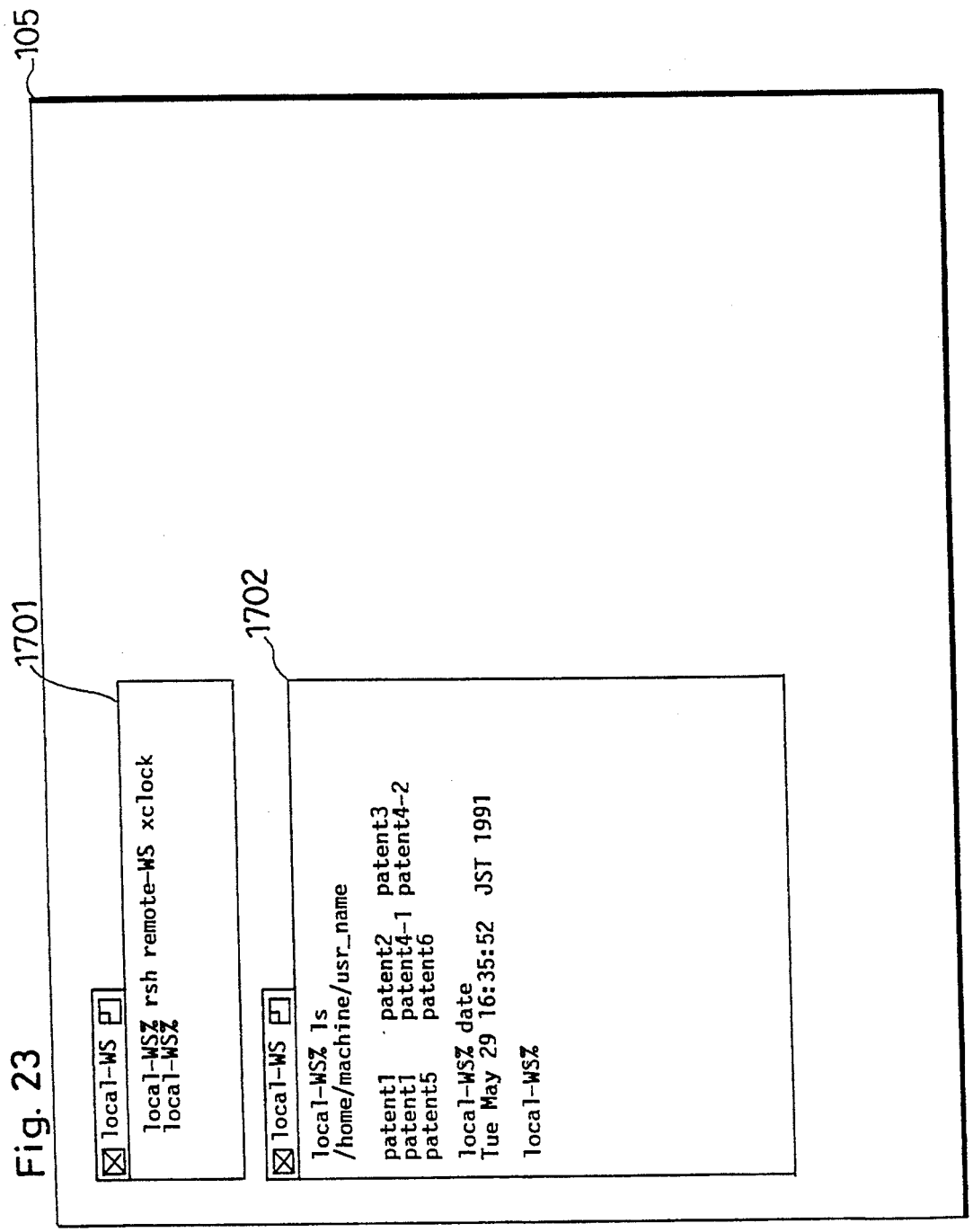
FIG. 23 is an illustration showing an example of the display of Embodiment III after the termination of non-resumable program.

The process control unit 301 renews the program execution condition table 1900 at the termination of the application program. The window system processing unit 302 renews the window system area 901b, therefore closing the window 1703 and the clock 1704 as well as renewing the VRAM area 902(S2103). As a result, only the windows 1701 and 1702 are displayed on the display device 110 as shown in FIG. 23.

Although the window is closed in the Embodiment, it is not necessarily closed so that another program application is subsequently executed.

The useless resumption program is not limited to the computer system used in the communication with another system as described in the Embodiment.

The users may be informed of the automatic termination of the resumed program application before the power off. The program termination requesting unit 4203 may be initiated at the power off, or the user may confirm the termination prior to the power off.

<Embodiment IV>

The computer system of the Embodiment IV can re-display the previous image regardless of the types of the windows used before the power off as well as to terminate automatically the useless resumption of the program.

Figure 24:
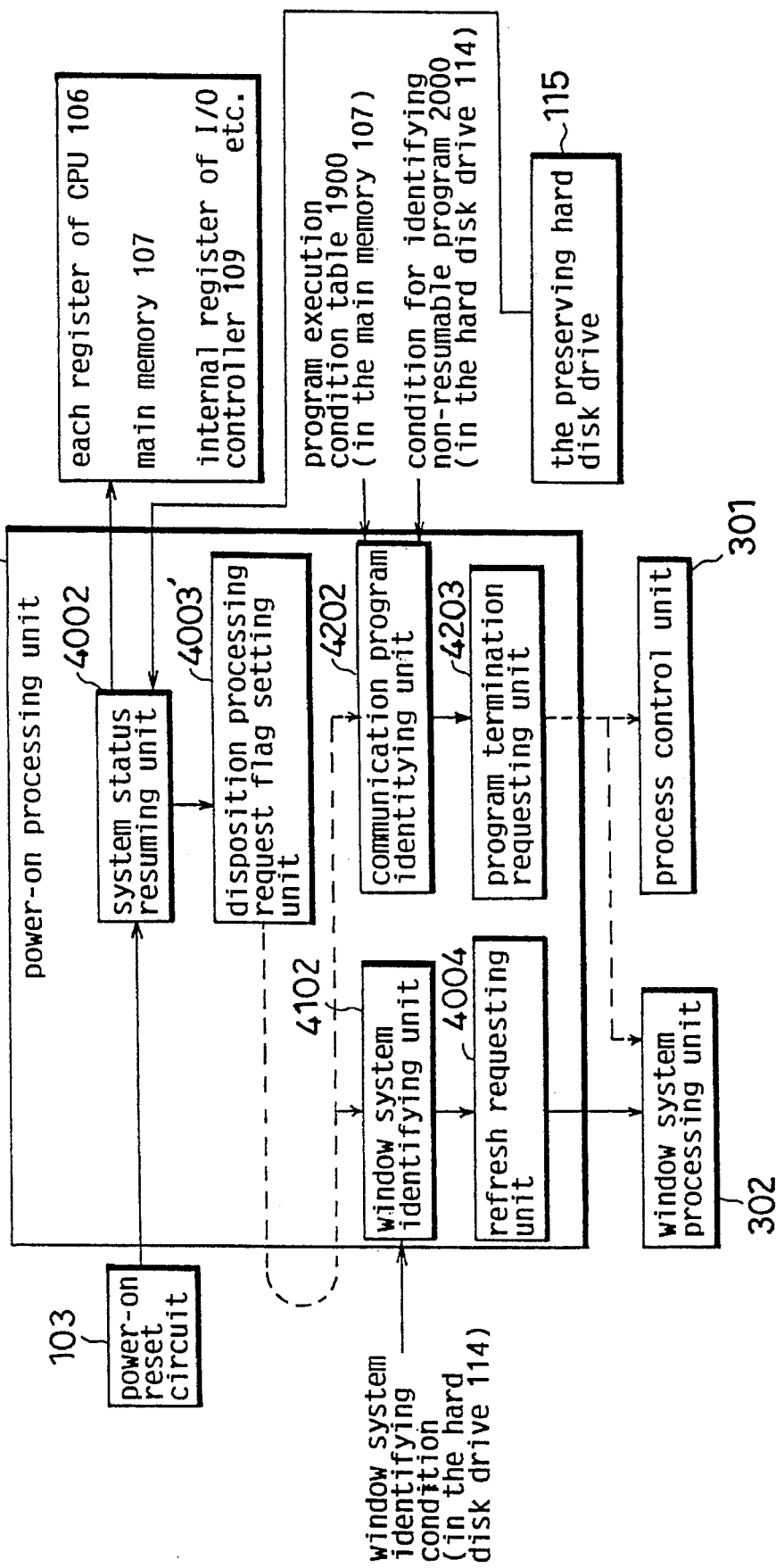
FIG. 24 is a block diagram showing the functional construction of the program routine of Embodiment III.
Figure 25:
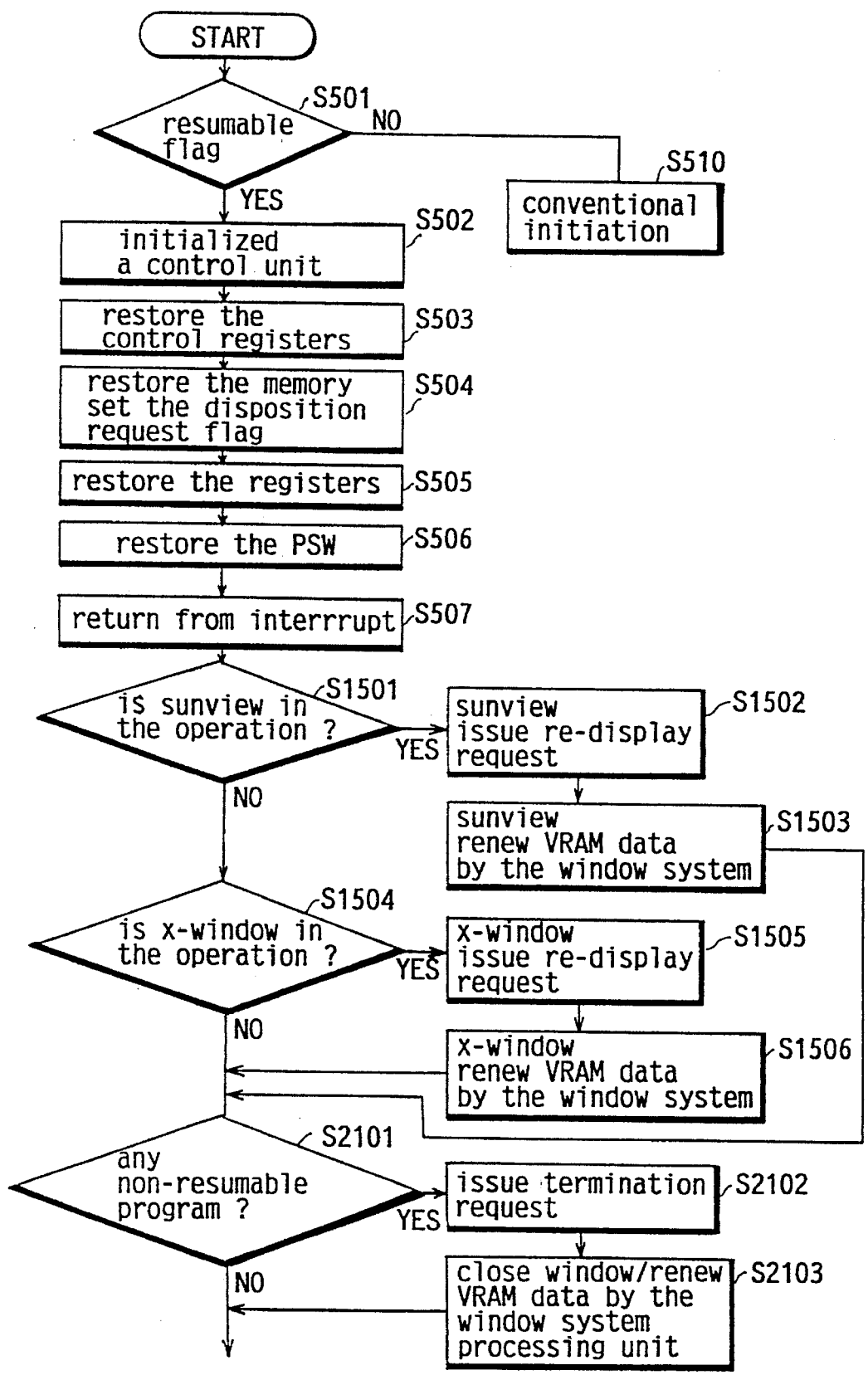

As shown in FIG. 24, the computer system of Embodiment IV has the same construction as the one of the Embodiments I, II and III except that a power-on processing unit 4301 having the window system identifying unit 4102 of the Embodiment II in addition to the power-on processing unit 4201 are installed.

(The operation of the system performed when the power switch 101 is on)

As in Embodiment I, the unit 4301 is initiated with the power switch 101. The power-on processing unit 4301 like the unit 4201 of the Embodiment III restores the system status before the power off, thereby initiating the application processing units or the like as well as setting the disposition request flag(S501)–(S507).

Initiated with the operating system processing unit, the window system identifying unit 4102 identifies the operation of the Sunview window system or X-window system like in the Embodiment II. Subsequently, the refresh requesting unit 4004 issues the refresh request corresponding to the operating window system, in the mean time, the window system processing unit 302 re-constructs the graphic display data, thereby renewing the contents of the window data areas 902a . . . of the VRAM area 902(S1501)–(S1506).

Initiated with the operating system processing unit, the communication identifying unit 4202 identifies the non-resumable application program like in the Embodiment III. The program termination requesting unit 4203 issues the termination request of the application program in response to the identification result, in turn, the process control unit 301 renews the program execution condition table 1900 at the termination of the application program. The window system processing unit 302 closes the window after having renewed the window system area 901b as well as renewing the contents of the VRAM area 902(S2101)–(S2103).

Above construction makes it possible to maintain the only continuable programs in the execution condition and to display the windows necessary for the program application on the display device 110.

The refresh request and termination request for the program may be issued prior to the execution of the interrupt restoring instruction without installing the refresh request flag setting unit 4003 or disposition request flag setting unit 4003'.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A control unit of a computer system comprising:

power supply means for supplying power to the computer system;

first storing means serving as a CPU's register, and input/output controlling device's register, and a volatile memory for holding written data while power is being supplied, said volatile memory's data includes graphic display data for generating a graphic display signal, and original graphic display data for generating the graphic display data;

second storing means for holding the data with no use of power;

a power switch for selectively outputting one of an ON signal and an OFF signal in accordance with the selection of an operator;

power-off preserving means for selectively transferring data related to the original graphic display data from the first storing means to the second storing means while leaving the graphic display data in the first storing means, data read out from the first storing means being stored in the second storing means by said transferring operation;

power-off preserving controlling means for detecting the OFF signal from the power switch to instruct the power-off preserving means to initiate said transferring operation;

power supply stopping means for instructing the power supply means to stop the power supply when detecting the completion of said transferring operation;

window system processing means for refreshing the graphic display by generating the graphic display data based on the original graphic display data held in the second storing means and by storing it in the first storing means;

refresh requesting means for requesting the window system processing means to refresh the graphic display;

power supply restarting means for instructing the power supply means to restart the supply of the power by detecting the ON signal from the power switch;

power-on resuming means for reading out the data stored in the second storing means to return them to the first storing means;

resuming means for the graphic display data for resuming the graphic display data based on the original graphic display data returned to the first storing means as well as storing the resumed graphic display data in the first storing means; and power-on controlling means for instructing the power-on resuming means to execute said transferring by detecting the ON signal from the power switch, and for instructing the refresh requesting means to request the refresh operation.

2. A control unit of a computer system of claim 1, the control unit further comprising window system judging condition holding means for holding conditions which are unique to each window system to identify the selected window system processing means, wherein the window system judging means identifies the selected window system processing means based on the window system judging conditions.

3. A control unit of a computer system of claim 2, wherein the window system judging condition includes given library functions and returned values which the window system processing means returns when the library functions are called.

4. The control unit of a computer system of claim 1, wherein the power-on controlling means includes flag setting means for requesting a refresh operation which sets a refresh requesting flag that instructs the refresh requesting means to request a refresh operation, and the refresh requesting means is initiated to a time period after a procedure before the power-off having been restarted, and requests the window system processing means to refresh the graphic display when the refresh request flag is set.

5. A control unit of a computer system comprising:

power supply means for supplying power to the computer system;

first storing means serving as a CPU's register, and input/output controlling device's register, and a volatile memory for holding written data while power is being supplied, said volatile memory's data includes graphic display data for generating a graphic display signal, and original graphic display data for generating the graphic display data;

second storing means for holding the data with no use of power;

a power switch for selectively outputting one of an ON signal and an OFF signal in accordance with the selection of an operator;

power-off preserving means for selectively transferring data related to the original graphic display data from the first storing means to the second storing means while leaving the graphic display data in the first storing means, data read out from the first storing means being stored in the second storing means by said transferring operation;

power-off preserving controlling means for detecting the OFF signal from the power switch to instruct the power-off preserving means to initiate said transferring operation;

power supply stopping means for instructing the power supply means to stop the power supply when detecting the completion of said transferring operation;

a plurality of window system processing means for refreshing the graphic display by generating the graphic display data based on the original graphic display data held in the second storing means and restored in the first storing means;

window system selecting means for selecting one window system processing means to activate it;

window system judging means for judging the window system processing means selected and activated by the window system selecting means;

refresh requesting means for requesting the window system processing means to refresh the graphic display based on the judging result of the window system judging means;

power supply restarting means for instructing the power supply means to restart the power supply by detecting the ON signal from the power switch;

power-on resuming means for reading out the data stored in the second storing means to return them to the first storing means;

resuming means for the graphic display data for resuming the graphic display data based on the original graphic display data returned to the first storing means as well as storing the resumed graphic display data in the first storing means; and power-on controlling means for instructing the power-on resuming means to execute said transferring operation by detecting the ON signal from the power switch, and for instructing the refresh requesting means to request the refresh operation.

6. A control unit of a computer system comprising;

first storing means for holding written data while power is being supplied from a power source;

second storing means for holding the written data with no use of electrical power is terminated power-off preserving means for powering off the system after transferring the data held in the first storing means to the second storing means;

window system processing means for refreshing the graphic display by producing graphic display data based on original data for the graphic display;

power-on resuming means for returning the data held in the second storing means to the first storing means;

refresh requesting means for requesting the window system processing means to refresh the graphic display after the data has been returned to the first storing means;

resuming means for resuming the execution of a program which was running before the powering off operation by resuming the previous status of the first storing means including registers in the computer system, registers in input-output units, and a volatile storing means, before the powering off operation;

system status holding means for holding information indicating the status of the computer system;

non-resumable condition holding means for a holding non-resumable condition according to which the previous process substantially cannot be resumed once the power is off, even if the stored contents in the storing means has been resumed when power is restored;

non-resumable condition judging means for judging whether the status of the computer system meets the non-resumable condition or not when a powering on operation is directed; and program execution terminating means for terminating the program execution when the computer system is judged by the non-resumable condition judging means to meet the non-resumable condition.

7. A control unit of a computer system comprising:

first storing means for holding written data while the power is being supplied from a power source;

a hard disk for holding the written data with no need for electrical power;

power-off preserving means for powering off the system after transferring the data held in the first storing means to the hard disk;

a plurality of window system processing means, one of which can refresh a graphic display by producing graphic display data based on original data for the graphic display;

power-on resuming means for returning the data held in the hard disk to the first storing means;

window system selecting means for selecting one window system processing means to activate it;

window system judging means for judging the selected window system processing means;

refresh requesting means for requesting the selected window system processing means to refresh the graphic display after the data has been returned to the first storing means;

resuming means for resuming the execution of a program which was running before the powering off operation by resuming the previous status of the first storing means including registers in the computer system, registers in input/output units, and a volatile storing means, before the powering-off operation;

system status holding means for holding information indicating the status of the computer system;

non-resumable condition holding means for a holding non-resumable condition according to which the previous process substantially cannot be resumed once the power is off, even if the stored contents in the storing means has been resumed when power is restored;

non-resumable condition judging means for judging whether the status of the computer system meets the non-resumable condition or not when a powering on operation is directed; and program execution terminating means for terminating the program execution when the computer system is judged by the non-resumable condition judging means to meet the non-resumable condition.

8. A method of controlling a computer system having a processor, a first data storing means for storing data, a second data means for storing data from the first data storing means and maintaining said data with no use of electrical power, means for transferring data, a display monitor, a window system processing means for providing window displays for the monitor, a power source for providing power to the computer system and a switch for indicating a power on or power off request signal by an operator, comprising the steps of:

indicating a power off signal initiated by an operator;

suspending any termination of power from the power source;

transferring data stored in the first data storing means to the second data storing means in response to the power off signal, including graphic display data;

determining when all of the data stored in the first data storing means has been transferred to the second data storing means;

terminating the power to the computer system wherein the contents of the first data storing means is lost and data transferred into the second data storing means is preserved;

indicating a power on signal;

returning the data stored in the second data storing means to the first data storing means;

determining if the window displays should be generated; and driving the window system processing means with the graphic display data to recreate the images on the display monitor when it has been determined that the window displays should be displayed.

9. A method of controlling a computer system having a processor, a first data storing means for storing data, a second data means for snoring data from the first data storing means and maintaining said data with no use of electrical power, means for transferring data, a display monitor, a plurality of window system processing means for providing window displays for the monitor, a power source for providing power to the computer system and a switch for indicating a power on or power off request signal by an operator, comprising the steps of:

indicating a power off signal initiated by an operator;

transferring data stored in the first data storing means to the second data storing means in response to the power off signal, including graphic display data;

determining when all of the data stored in the first data storing means has been transferred to the second data storing means;

terminating the power to the computer system wherein the contents of the first data storing means is lost and data transferred into the second data storing means is preserved;

indicating a power on signal;

returning the data stored in the second data storing means to the first data storing means;

determining if a window display from one of the window system processing means should be generated; and driving the selected window system processing means with the graphic display data to recreate the images on the display monitor when it has been determined that one of the window displays should be displayed.

10. A method of controlling a computer system having a processor, a first data storing means for storing data, a second data means for storing data from the first data storing means and maintaining said data with no use of electrical power, means for transferring data, a display monitor, a plurality of window system processing means for providing window displays for the monitor, a power source for providing power to the computer system and a switch for indicating a power on or power off request signal by an operator, computer system status means for storing information indicating the status of the computer system during the execution of the computer program, comprising the steps of:

indicating a power off signal initiated by an operator;

intentionally delaying any termination of power from the power source;

transferring data stored in the first data storing means to the second data storing means in response to the power off signal, including graphic display data;

determining when all of the data stored in the first data storing means has been transferred to the second data storing means;

terminating the power to the computer system when it has been determined that the data has been transferred wherein the contents of the first data storing means is lost and data transferred into the second data storing means is preserved;

indicating a power on signal;

returning the data stored in the second data storing means to the first data storing means;

determining if a window display from one of the window system processing means should be generated;

driving the selected window system processing means with the graphic display data to recreate the images on the display monitor when it has been determined that one of the window displays should be displayed;

determining if the information stored in the computer system status means indicates if the computer program can be run again; and terminating the execution of the computer program if it is determined that it cannot be run again.

* * * * *